(12) United States Patent
Hashimoto et al.

(10) Patent No.: US 9,077,921 B2
(45) Date of Patent: Jul. 7, 2015

(54) IMAGE PICKUP APPARATUS, IMAGE PICKUP SYSTEM, DRIVING METHOD FOR IMAGE PICKUP APPARATUS, AND DRIVING METHOD FOR IMAGE PICKUP SYSTEM USING TWO ANALOG-TO-DIGITAL CONVERSIONS

(71) Applicant: CANON KABUSHIKI KAISHA, Tokyo (JP)

(72) Inventors: Seiji Hashimoto, Yokohama (JP); Takeru Suzuki, Kawasaki (JP); Atsushi Furubayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 110 days.

(21) Appl. No.: 13/779,396

(22) Filed: Feb. 27, 2013

(65) Prior Publication Data
US 2013/0229557 A1 Sep. 5, 2013

(30) Foreign Application Priority Data

Mar. 1, 2012 (JP) .................. 2012-045652

(51) Int. Cl.
| | |
|---|---|
| H04N 3/14 | (2006.01) |
| H04N 5/335 | (2011.01) |
| H03M 1/12 | (2006.01) |
| H03M 1/00 | (2006.01) |
| H04N 5/3745 | (2011.01) |
| H04N 5/369 | (2011.01) |
| H04N 5/378 | (2011.01) |

(52) U.S. Cl.
CPC ........... *H04N 5/3745* (2013.01); *H04N 5/3696* (2013.01); *H04N 5/37457* (2013.01); *H04N 5/378* (2013.01)

(58) Field of Classification Search
CPC ............ H04N 5/3745; H04N 5/37452; H04N 5/37455; H04N 5/3696; H04N 5/374578; H04N 5/378
USPC .................... 348/572, 294–324; 341/126–172
See application file for complete search history.

(56) References Cited

U.S. PATENT DOCUMENTS

| | | | | |
|---|---|---|---|---|
| 5,301,240 | A * | 4/1994 | Stockum et al. | 382/100 |
| 6,307,195 | B1 * | 10/2001 | Guidash | 250/208.1 |
| 6,765,611 | B1 * | 7/2004 | Gallagher et al. | 348/222.1 |
| 7,382,407 | B2 * | 6/2008 | Cho et al. | 348/296 |
| 7,508,421 | B2 * | 3/2009 | Tamaru et al. | 348/229.1 |
| 7,595,824 | B2 * | 9/2009 | Egawa et al. | 348/241 |
| 7,605,940 | B2 * | 10/2009 | Silverbrook et al. | 358/1.17 |
| 7,786,422 | B2 * | 8/2010 | Davidovici | 250/208.1 |
| 7,812,870 | B2 * | 10/2010 | Utz et al. | 348/277 |
| 7,884,871 | B2 * | 2/2011 | Smith et al. | 348/308 |
| 8,149,309 | B2 * | 4/2012 | Tanaka | 348/300 |

(Continued)

FOREIGN PATENT DOCUMENTS

| | | |
|---|---|---|
| JP | 2001-83407 A | 3/2001 |
| JP | 2002-320146 A | 10/2002 |

(Continued)

*Primary Examiner* — Chia-Wei A Chen
(74) *Attorney, Agent, or Firm* — Canon USA, Inc. IP Division

(57) ABSTRACT

An image pickup apparatus includes a plurality of comparators. At least two analog signal outputs from a pixel are input to the plurality of comparators, and the plurality of comparators perform comparison operations in an overlapped period.

21 Claims, 11 Drawing Sheets

(56) References Cited

U.S. PATENT DOCUMENTS

| | | | |
|---|---|---|---|
| 8,462,246 B2* | 6/2013 | Lee et al. | 348/308 |
| RE44,482 E* | 9/2013 | Berezin et al. | 257/233 |
| 8,797,434 B2* | 8/2014 | Lee et al. | 348/299 |
| 2002/0050940 A1* | 5/2002 | Sato et al. | 341/155 |
| 2003/0085402 A1* | 5/2003 | Tay | 257/72 |
| 2003/0189209 A2* | 10/2003 | Tay | 257/72 |
| 2004/0095490 A1* | 5/2004 | Huang et al. | 348/294 |
| 2005/0093990 A1* | 5/2005 | Aoyama | 348/222.1 |
| 2005/0174452 A1* | 8/2005 | Blerkom et al. | 348/294 |
| 2006/0066750 A1* | 3/2006 | Henderson et al. | 348/362 |
| 2007/0070223 A1* | 3/2007 | Tamaru et al. | 348/255 |
| 2008/0018764 A1* | 1/2008 | Mizoguchi | 348/308 |
| 2008/0218621 A1* | 9/2008 | Cho et al. | 348/308 |
| 2009/0008532 A1* | 1/2009 | Setoguchi | 250/208.1 |
| 2009/0128676 A1* | 5/2009 | Tanaka | 348/300 |
| 2010/0194948 A1* | 8/2010 | Murakami et al. | 348/302 |
| 2010/0259662 A1* | 10/2010 | Oike et al. | 348/308 |
| 2011/0019042 A1* | 1/2011 | Yamaguchi | 348/280 |
| 2012/0002088 A1* | 1/2012 | Fukushima | 348/294 |
| 2012/0008028 A1* | 1/2012 | Egawa | 348/300 |
| 2012/0033118 A1* | 2/2012 | Lee et al. | 348/296 |
| 2012/0038809 A1* | 2/2012 | Lee et al. | 348/308 |
| 2012/0061555 A1* | 3/2012 | Ay | 250/208.1 |
| 2012/0113286 A1* | 5/2012 | Lim et al. | 348/222.1 |
| 2012/0120290 A1* | 5/2012 | Kim | 348/294 |
| 2012/0126094 A1* | 5/2012 | Simony et al. | 250/208.1 |
| 2012/0154656 A1* | 6/2012 | Oike et al. | 348/308 |
| 2012/0262614 A1* | 10/2012 | Deng et al. | 348/302 |
| 2013/0027594 A1* | 1/2013 | Krymski | 348/300 |
| 2013/0033628 A1* | 2/2013 | Yamaguchi | 348/294 |
| 2013/0088624 A1* | 4/2013 | Mo et al. | 348/300 |
| 2013/0182161 A1* | 7/2013 | Nakajima | 348/300 |
| 2013/0193949 A1* | 8/2013 | Wakabayashi | 323/313 |
| 2013/0277537 A1* | 10/2013 | Altice et al. | 250/208.1 |
| 2014/0009656 A1* | 1/2014 | Oike et al. | 348/308 |
| 2014/0022430 A1* | 1/2014 | Ueno et al. | 348/308 |
| 2014/0061442 A1* | 3/2014 | Denham | 250/214 DC |
| 2014/0273327 A1* | 9/2014 | Nakamura | 438/57 |

FOREIGN PATENT DOCUMENTS

| | | |
|---|---|---|
| JP | 2005-303648 A | 10/2005 |
| JP | 2011-015365 A | 1/2011 |

* cited by examiner

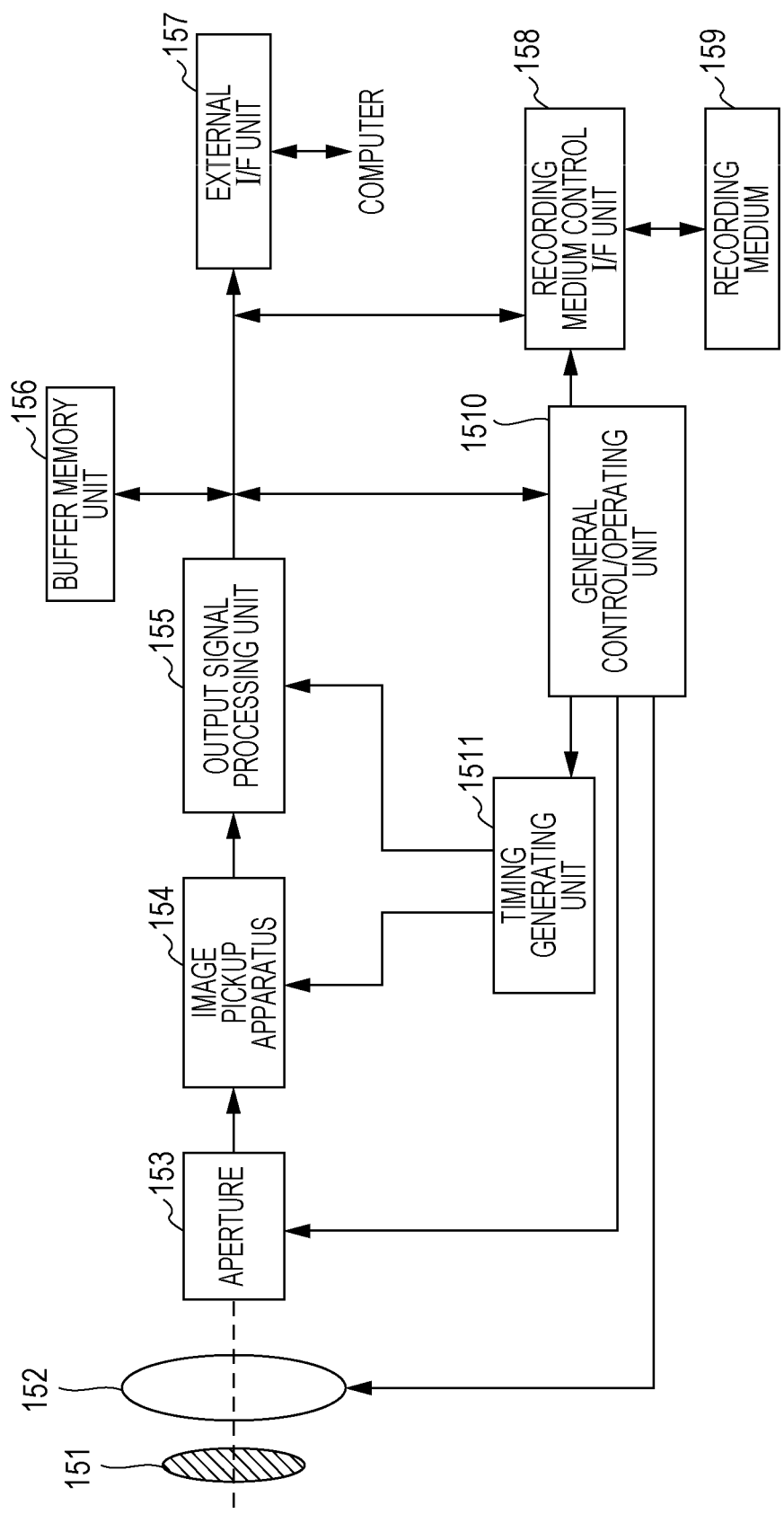

IMAGE PICKUP APPARATUS, IMAGE PICKUP SYSTEM, DRIVING METHOD FOR IMAGE PICKUP APPARATUS, AND DRIVING METHOD FOR IMAGE PICKUP SYSTEM USING TWO ANALOG-TO-DIGITAL CONVERSIONS

BACKGROUND OF THE INVENTION

1. Field of the Invention

One disclosed aspect of the embodiments relates to image pickup apparatuses having a plurality of pixels containing a plurality of photoelectric conversion units.

2. Description of the Related Art

In recent years, an image pickup apparatus having pixels containing photoelectric conversion units has been required to carry out quick signal output.

For example, an image pickup apparatus has been known which includes pixels which perform photoelectric conversion and output signals based on incident light and a column parallel analog-digital converting circuit having an AD converter at each column of a pixel array in which pixels are arranged in matrix form. Hereinafter, an analog-digital converting circuit will be called an ADC. A column parallel ADC will be called a column ADC. In the column ADC, analog-digital conversion (hereinafter, called AD conversion) is performed in which a control unit of each column converts an analog signal output from a pixel to a digital signal. (Hereinafter, an analog signal output from a pixel will be called a pixel signal).

On the other hand, Japanese Patent Laid-Open No. 2001-83407 discloses an image pickup apparatus which has a plurality of photoelectric conversion units for each microlens of a two-dimensionally arranged microlens array and performs focal point detection by phase difference detection. It further discloses that a signal based on a signal charge of a first photoelectric conversion unit of a plurality of photoelectric conversion units, a signal based on a signal charge of a second photoelectric conversion unit that is different from the first photoelectric conversion unit, and a signal based on a signal charge combining the first photoelectric conversion unit and the second photoelectric conversion unit are output.

Japanese Patent Laid-Open No. 2002-320146 discloses a configuration in which pixels are arranged in matrix form, signals output from different pixels are added and the added signal is output to an operational amplifier. Japanese Patent Laid-Open No. 2002-320146 discloses a configuration having an operational amplifier at each column of pixels. Furthermore, in an image pickup apparatus according to Japanese Patent Laid-Open No. 2002-320146, an operational amplifier at one column and a noninverting input terminal (−) of an operational amplifier of a neighboring column are connected via a switch. This allows addition of signals of pixels of neighboring columns and output the added signal to an operational amplifier.

The image pickup apparatus of Japanese Patent Laid-Open No. 2001-83407 does not consider quick conversion of at least two analog signals output pixels to digital signals.

Japanese Patent Laid-Open No. 2002-320146 does not sufficiently consider quick conversion of at least two analog signals output from pixels of a plurality of columns to digital signals.

SUMMARY OF THE INVENTION

According to an aspect of the embodiments, an image pickup apparatus includes a pixel that outputs a plurality of photoelectric conversion signals, a first analog-digital converting unit that performs at least a part of an operation of converting a first photoelectric conversion signal in the plurality of photoelectric conversion signals to a digital signal during a first period, and a second analog-digital converting unit that performs at least a part of an operation of converting a second photoelectric conversion signal in the plurality of photoelectric conversion signals, which is different from the first photoelectric conversion signal, to a digital signal during the first period.

According to another aspect of the embodiments, there is provided a driving method for an image pickup apparatus having a pixel that outputs a plurality of photoelectric conversion signals, a first analog-digital converting unit, and a second analog-digital converting unit. The method includes causing the first analog-digital converting unit to perform at least a part of an operation of converting a first photoelectric conversion signal in the plurality of photoelectric conversion signals to a digital signal during a first period, and the second analog-digital converting unit to perform at least a part of an operation of converting a second photoelectric conversion signal in the plurality of photoelectric conversion signals, which is different from the first photoelectric conversion signal, to a digital signal during the first period.

According to another aspect of the embodiments, there is provided a driving method for an image pickup system, in which the image pickup system has an image pickup apparatus, and an optical system that condenses light beams to the image pickup apparatus, the image pickup system performs signal processing on a signal output from the image pickup apparatus, and the image pickup apparatus has a pixel having n photoelectric conversion units (where n is a natural number that is equal to or higher than 2), a first analog-digital converting unit and a second analog-digital converting unit, and a lens array having a plurality of microlenses, and light condensed to one of the microlenses enters to the n photoelectric conversion units that the pixel has. The driving method includes causing the pixel to output a first photoelectric conversion signal based on signal charges generated by m photoelectric conversion units included in the n photoelectric conversion units (where m is a natural number that satisfies a relational expression of n>m) on basis of incident light thereon to the first analog-digital converting unit, the pixel to output second photoelectric conversion signal based on signal charges generated by the n photoelectric conversion units on basis of incident light thereon to the second analog-digital converting unit, the first analog-digital converting unit to perform at least a part of an operation of converting the first photoelectric conversion signal to a digital signal during a first period, the second analog-digital converting unit to perform at least a part of an operation of converting the second photoelectric conversion signal to a digital signal during the first period, the image pickup apparatus to output a digital signal based on the first photoelectric conversion signal, and the image pickup apparatus to further output a digital signal based on the second photoelectric conversion signal, acquiring a difference signal that is a difference between digital signals based on the first photoelectric conversion signal and the second photoelectric conversion signal, causing to perform a focal point detection with a digital signal based on the first photoelectric conversion signal used for acquiring the difference signal and the difference signal, and forming an image with a digital signal based on the second photoelectric conversion signal from the pixel.

One disclosed aspect of the embodiments allows quick conversion of at least two analog signals output from pixels to digital signals.

Further features of the disclosure will become apparent from the following description of exemplary embodiments with reference to the attached drawings.

BRIEF DESCRIPTION OF THE DRAWINGS

FIG. 11 is a block diagram of an image pickup system.

DESCRIPTION OF THE EMBODIMENTS

First Embodiment

An image pickup apparatus according to a first embodiment will be described below with reference to drawings.

Figure 1:
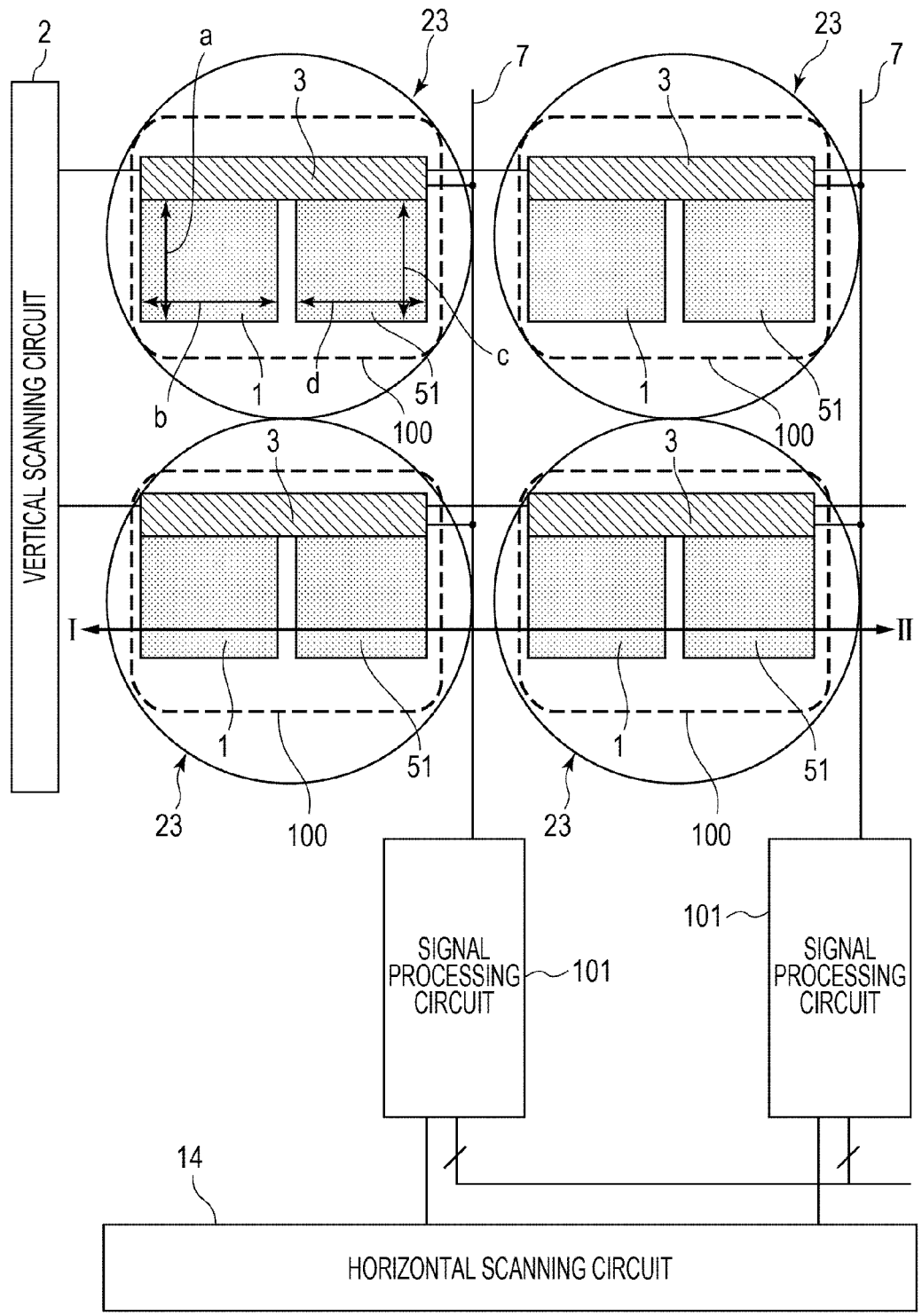
FIG. 1 illustrates an overhead view of an image pickup apparatus and an equivalent circuit diagram.

FIG. 1 schematically illustrates an overhead view of an image pickup apparatus according to this embodiment and a circuit configuration that reads signals from pixels. A pixel 100 has a first photodiode 1 that is a first photoelectric conversion unit, a second photodiode 51 that is a second photoelectric conversion unit, and an in-pixel readout control unit 3 electrically connected to the photodiodes 1 and 51. The pixels 100 are arranged over a plurality of rows and a plurality of columns. In other words, the pixels 100 are arranged in matrix form. The area having the pixels 100 in matrix form will be called a pixel part. The photodiode 1 and photodiode 51 of one pixel 100 will collectively be called a photodetector if necessary. One microlens 23 is arranged to cover one photodetector for guiding incident light to the photodetector. In other words, one microlens corresponds to one photodetector and guides incident light to a plurality of photoelectric conversion unit of the corresponding pixel 100. The image pickup apparatus of this embodiment has a microlens array having a plurality of microlenses 23. The photodiode area such as an area of the photodiode 1 is indicated by a×b illustrated in FIG. 1. Similarly, the area of the photodiode 51 is indicated by c×d in FIG. 1. A receiving surface of the photodiode 1 is a surface having the area a×b. Similarly, a receiving surface of the photodiode 51 has the area c×d.

The pixels 100 are sequentially scanned by a vertical scanning circuit 2. The pixels 100 at a row selected by the vertical scanning circuit 2 outputs pixel signals to a vertical signal line 7. The vertical signal line 7 transmits the pixel signals output from the pixels 100 to a signal processing circuit 101. The signal processing circuit 101 processes the pixel signals output from the pixels 100. The signal processing circuit 101 includes an analog-digital converting unit that converts analog signals output from the pixels 100 to digital signals. The signal processing circuits 101 are sequentially scanned column by column by the horizontal scanning circuit 14. In FIG. 1, the photodiodes 1 and 51 in the pixel 100 are arranged along the direction in which the signal processing circuits 101 of each column align. In other words, the two photodiodes 1 and 51 are provided within each of the pixels 100. The in-pixel signal readout circuit 3 outputs a signal based on signal charges generated by the photodiodes 1 and 51 to the vertical signal line 7. The in-pixel signal readout circuit 3 includes transfer MOS transistors 20 and 50, a reset MOS transistor 4, an amplify MOS transistor 5, and a select MOS transistor 6.

Figure 2:
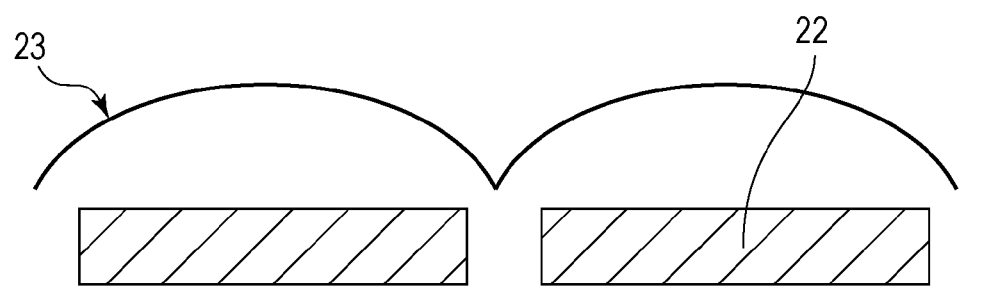
FIG. 2 is a section view of an image pickup apparatus.
Figure 2:
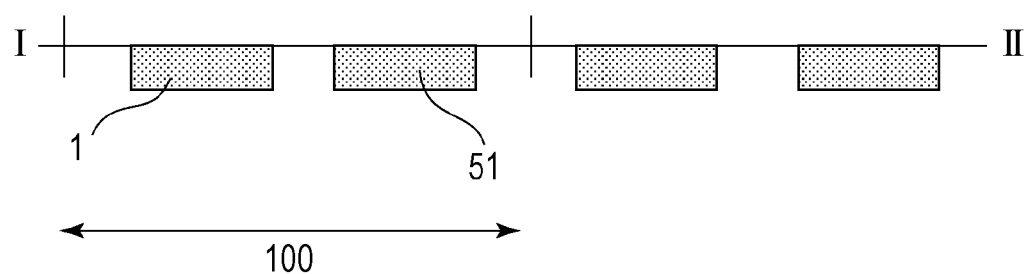

Next, FIG. 2 illustrates a cross-section view of the pixels 100 taken at the straight line I-II in FIG. 1. A color filter 22 is provided between the microlens 23 and the photodiodes 1 and 51.

The pixels provided in an image pickup apparatus of this embodiment outputs a signal on which a focal-point detection signal for focal point detection by phase difference detection is based and a signal on which an image acquisition signal that is a signal for imaging is based. For example, a plurality of pixels at linear positions or cross positions in the pixel part output signals on which a focal-point detection signal is based. The image pickup apparatus processes a signal on which a focal-point detection signal is based and a signal on which an image acquisition signal is based, which are output from a pixel, and outputs a focal-point detection signal and an image acquisition signal. On basis of the focal-point detection signal output from the image pickup apparatus, the phase difference of light beams incident on two photoelectric conversion units may be detected. On basis of the detected phase difference, focal point detection may be performed.

Figure 3:
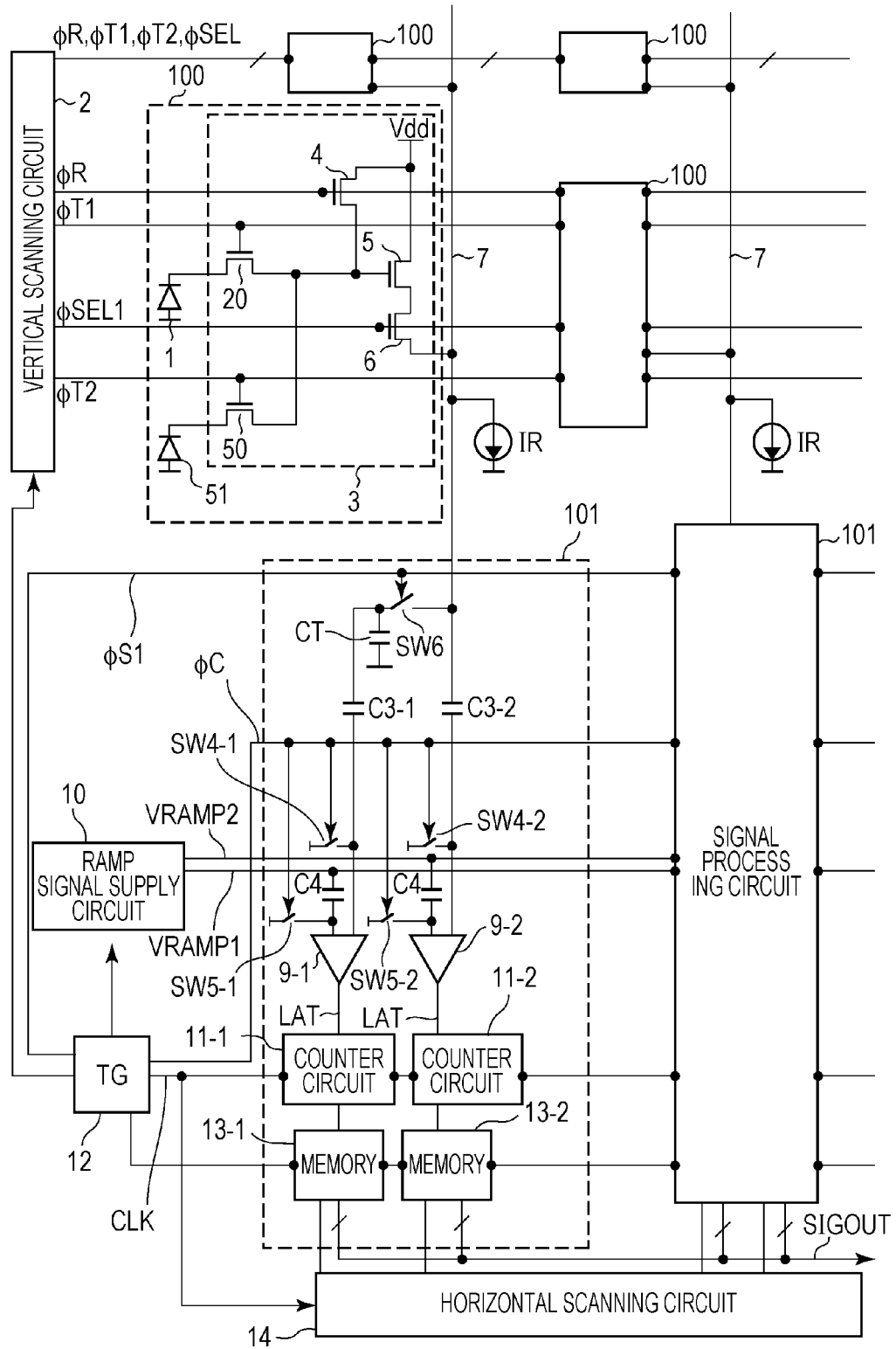
FIG. 3 is an equivalent circuit diagram of an image pickup apparatus.

FIG. 3 is a block diagram schematically illustrating 2-row by 2-column pixels 100 and 2 column signal processing circuits 101 extracted from the image pickup apparatus of this embodiment.

First, each of the pixels 100 will be described.

The pixel 100 has the transfer MOS transistors 20 and 50, reset MOS transistor 4, amplify MOS transistor 5, and select MOS transistor 6. When light enters to the photodiodes 1 and 51, photoelectric conversion generates signal charges. The transfer MOS transistor 20 is electrically connected to the photodiode 1 and an input node of the amplify MOS transistor 5. The transfer MOS transistor 50 is electrically connected to the photodiode 51 and an input node of the amplify MOS transistor 5. When a transfer pulse φT1 supplied from a vertical scanning circuit, which will be described below, to a gate of the transfer MOS transistor 20 has a High level, signal charges in the photodiode 1 are transferred to the input node of the amplify MOS transistor 5. (Hereinafter, a high level will be called an H level. Similarly, a Low level will be called an L level.) When transfer pulse φT2 supplied from the vertical scanning circuit 2 to a gate of the transfer MOS transistor 50 has an H level, signal charges in the photodiode 51 are transmitted to the input node of the amplify MOS transistor 5. When a reset pulse φR supplied from the vertical scanning circuit 2 to a gate of the reset MOS transistor 4 has an H level, the potential of the input node of the amplify MOS transistor 5 is reset. The amplify MOS transistor 5 is electrically connected to the vertical signal line 7 through the select MOS transistor 6. The amplify MOS transistor 5 outputs an electric signal on basis of the signal charges in the input node of the amplify MOS transistor 5. The select MOS transistor 6 brings a path from the amplify MOS transistor 5 to the vertical signal line 7 into conduction when a select pulse φSEL1 has an H level.

A signal output to the vertical signal line 7 on basis of the potential of the input node of the amplify MOS transistor 5 to which signal charges are transferred from the photodiode 1 will be called signal A. A signal output to the vertical signal line 7 on basis of the potential of the input node of the amplify MOS transistor 5 to which signal charges are transferred from the photodiode 51 will be called a signal B. The signal A and signal B are signals on which a focal-point detection signal to be used for focal point detection is based. The signal A is a first photoelectric conversion signal output by the pixel 100. The H levels of the transfer pulses φT1 and φT2 transfer signal charges stored in the photodiodes 1 and 51 to the input node of the amplify MOS transistor 5. A signal output to the vertical signal line 7 on basis of the potential of the input node of the amplify MOS transistor 5 in this case will be called signal A+B. The signal A+B is a signal on which an image acquisition signal is based and is a second photoelectric conversion signal. According to this embodiment, an output operation from the pixel 100 is not performed on the signal B, that is, a signal output to the vertical signal line 7 in response to the transfer of signal charges held as a result of photoelectric conversion in the photodiode 51 to the input node of the amplify MOS transistor 5. A signal corresponding to the signal B may be acquired when a digital signal processing circuit, which will be described below, performs difference processing between an image acquisition signal and a focal-point detection signal.

According to this embodiment, in order to perform Correlated Double Sampling (hereinafter called a CDS), three signals are sampled including an signal N that is a signal output from the amplify MOS transistor 5 through the select MOS transistor 6 when the potential of the input node of the amplify MOS transistor 5 is shifted to a reset level, and the aforementioned signal A and signal A+B.

The pixel signal according to this embodiment generally refers to a signal output from the pixel 100 to the vertical signal line 7, including a signal N, a signal A, and a signal A+B output from the pixel 100. The signal A and signal A+B are photoelectric conversion signals based on signal charges generated by a photodetector from light entering thereto. The signal N is a noise signal containing a noise component of the pixel 100.

Next, the signal processing circuit 101 will be described. Clamp capacitors C3-1 and C3-2 store or hold the signal N. A capacitor CT stores or holds a signal output to the vertical signal line 7 when a switch SW6 is ON. According to this embodiment, the capacitor CT stores or holds the signal A.

According to this embodiment, two comparators 9-1 and 9-2 are provided for one column of the pixels 100. The comparators 9-1 and 9-2 receive input of a signal containing signal Vref. The comparator 9-1 receives input of signal A+Vref containing the signal Vref as a result of subtraction of the signal N from the signal A+N. The comparator 9-2 receives input of a signal A+B+Vref containing the signal Vref as a result of subtraction of the signal N from the signal A+B+N. In other words, performing CDS by using the clamp capacitors C3-1 and C3-2 may supply to the comparators 9-1 and 9-2 signals as a result of subtraction of the signal N from the signal A+N and signal A+B+N. The signals to be input to the comparators 9-1 and 9-2 will be called signal A and signal A+B, respectively, by omitting the signal Vref of the signal A+Vref and signal A+B+Vref. The comparator 9-1 compares the signal A and the reference signal VRAMP1, and the comparator 9-2 compares the signal A+B and the reference signal VRAMP2. The reference signals VRAMP1 and VRAMP2 are signals supplied from a reference signal supplying circuit 10 to the comparators 9-1 and 9-2 through capacitors C4 each of which is provided for each column and change their potentials in time-dependently. The signal Vref is supplied to terminals of the comparators 9-1 and 9-2 via switches SW5-1 and SW5-2, respectively. The comparator 9-1 outputs a latch signal LAT to a counter circuit 11-1 when a magnitude relationship between the pixel signal input from the pixel 100 through the clamp capacitor C3-1, which is supplied to one terminal, and the reference signal VRAMP1 which is supplied to another terminal is inverted. The comparator 9-2 outputs a latch signal LAT to the counter circuit 11-2 when the magnitude relationship between the pixel signal input through the clamp capacitor C3-2, which is supplied to one terminal and reference signal VRAMP2 with is supplied to another terminal is inverted. The latch signal LAT output by the comparators 9-1 and 9-2 are comparison result signals based on a comparison result of comparison between the pixel signal and the reference signal.

When the reference signals VRAMP1 and VRAMP2 start changing their potential in time-dependent manner, the counter circuits 11-1 and 11-2 start counting a clock pulse signal CLK supplied from a timing generator (hereinafter, called a TG) 12. The counter circuits 11-1 and 11-2 have up/down counters each of which up and down counts a clock pulse signal CLK. The counter circuit 11-1 finishes counting the clock pulse signal CLK when the comparator 9-1 outputs the latch signal LAT. The counter circuit 11-2 also finishes count the clock pulse signal CLK when the comparator 9-2 outputs the latch signal LAT. The signal as a result of counting clock pulse signals by the counter circuits 11-1 and 11-2 will be called a count signal CNT.

The memory 13-1 stores or holds a count signal CNT as a result of counting clock pulse signals CLK by the counter circuit 11-1. The memory 13-2 stores or holds a count signal CNT as a result of counting clock pulse signals CLK by the counter circuit 11-2. The count signal CNT stored or held by the memory 13-1 is a digital signal based on the signal A. The digital signal will be called a digital signal A. The count signal CNT stored or held by the memory 13-2 is a digital signal based on the signal A+B. The digital signal will be called a digital signal A+B. A first analog-digital converting unit according to this embodiment includes the comparator 9-1, counter circuit 11-1, and memory 13-1. A second analog-digital converting unit according to this embodiment includes the comparator 9-2, counter circuit 11-2, and memory 13-2. In other words, each of the signal processing circuits 101 has a plurality of analog-digital converting units.

The horizontal scanning circuit 14 sequentially selects the memory 13 of each column on basis of the clock pulse signal CLK supplied from the TG 12 and reads the count signal CNT held by the memory 13 of each column. The count signal CNT output from the memory 13 is a signal SIGOUT output from the image pickup apparatus.

Next, an example of an operation of the image pickup apparatus illustrated in FIG. 3 will be described with reference to FIG. 4. A switch pulse φS1 is a pulse that controls the switch SW6, and the switch SW6 has a conductive state when the pulse has an H level. The signal processing circuit reset pulse φC is a pulse that controls the switches SW4-1, 4-2, 5-1, and 5-2. When the signal processing circuit reset pulse φC has an H level, the switches SW4-1, 4-2, 5-1, and 5-2 have a conductive state. V1 denotes the potential of the vertical signal line 7.

At time t1, the pixel reset pulse φR, select pulse φSEL, signal processing circuit reset pulse φC, and switch pulse φS1 are made to have an H level. At a time t2, a pixel reset pulse φR is made to have an L level. This resets the potential of the input node of the amplify MOS transistor 5.

At a time t3, the signal processing circuit reset pulse φC and switch pulse φS1 are made to have an L-level. A signal N is a signal output to the vertical signal line 7 at the time t3. The clamp capacitor C3-1, C3-2, capacitor CT, and capacitor C4 store or hold charges based on the potential at the time t3. The reference signal supplying circuit 10 starts changing the potential depending on the times of the reference signals VRAMP1 and VRAMP2. The counter circuits 11-1 and 11-2 start counting clock pulse signals CLK supplied from the TG 12. At that time, the counter circuits 11-1 and 11-2 perform down-counting. The comparator 9-1 compares a reference signal containing a signal input through the clamp capacitor C3-1 with their charges based on the potential at time t3 held and the signal Vref and the reference signal VRAMP1. The comparator 9-2 compares a signal input through the clamp capacitor C3-2 with their charges based on the potential at time t3 held and the reference signal VRAMP2. The comparators 9-1 and 9-2 output the latch signal LAT to the counter circuits 11-1 and 11-2, respectively, when the magnitude relationship of the compared signals is inverted.

At a time t4, the reference signal supplying circuit 10 stops changing the potential depending on the times of the reference signals VRAMP1 and VRAMP2. The period from the time t3 to the time t4 will be called N conversion period TN. The operation to be performed during the period from the time t3 to the time t4 will be called N conversion.

At a time t5, the transfer pulse φT1 and switch pulse φS1 are made to have an H level. This causes the signal A to be output from the pixel 100 to the vertical signal line 7. At a time t6, the transfer pulse φT1 and switch pulse φS1 are made to have an L-level. The capacitor CT stores or holds the charge based on the potential of the vertical signal line 7 at the time t6. In other words, the capacitor CT stores or holds the signal A output from the pixel 100.

The signal A is supplied to the comparator 9-1. At a time t6, the reference signal supplying circuit 10 starts changing the potential depending on the time of the reference signal VRAMP1. The counter circuit 11-1 starts counting the clock pulse signals CLK supplied from the TG 12. At that time, the counter circuit 11-1 performs up-counting by using the count signal value held by the last N conversion as a starting value. The comparator 9-1 outputs the latch signal LAT to the counter circuit 11-1 when the magnitude relationship between the reference signal VRAMP1 and the signal A is inverted. The change of the potential depending on the time of the reference signal VRAMP1 is stopped at a time t9 after a time t8 when the change of the potential depending on the time of the reference signal VRAMP2 starts. The period from the time t6 to the time t9 will be called A conversion period TA. The comparator 9-1 is a first comparator.

At a time t7, the transfer pulse φT2 is made to have an H level. Because the input node of the amplify MOS transistor 5 holds the potential at the previous time t6, the signal A+B is output to the vertical signal line 7. At the time t8, the transfer pulse φT2 is made to have an L-level.

The signal A+B is supplied to the comparator 9-2. At the time t8 then, the reference signal supplying circuit 10 starts changing the potential depending on the time of the reference signal VRAMP2. The counter circuit 11-2 starts counting the clock pulse signals CLK supplied by the TG 12. At that time, the counter circuit 11-2 performs up-counting by using the count signal value held at the last N conversion as a starting value. The comparator 9-2 outputs the latch signal LAT to the counter circuit 11-2 when the magnitude relationship between the reference signal VRAMP2 and the signal A+B is inverted.

At a time t10, the change of the potential depending on the time of the reference signal VRAMP2 is stopped. The period from the time t8 to the time t10 will be called A+B conversion period TAB. The comparator 9-2 is a second comparator. The period from the time t1 to the time t10, that is, the period from the output of a pixel signal by the pixel 100 to the conversion to a digital signal will be called an AD conversion period TAD.

At a time t11, the horizontal scanning circuit 14 makes a horizontal scan signal φH to an H level and transfers the digital signal N and digital signal A held in the memory 13-1 and the digital signal N and digital signal A+B held in the memory 13-2 from the memories 13-1 and 13-2.

In the image pickup apparatus of this embodiment, a part of the A conversion period TA and a part of the A+B conversion period TAB overlap. The period when the A conversion period TA and the A+B conversion period TAB overlap is a first period. In other words, there are provided a first analog-digital converting unit that performs at least a part of an operation of converting the first photoelectric conversion signal to a digital signal during the first period and a second analog-digital converting unit that performs at least a part of the operation of converting the second photoelectric conversion signal to a digital signal during the first period. The A conversion period TA is a second period when the first comparator performs a comparison operation. The A+B conversion period TAB is a third period when the second comparator performs a comparison operation. In other words, the first period is a period when the second period and the third period overlap. Thus, the partial overlap of the A conversion period TA and the A+B conversion period TAB may shorten the AD conversion period TAD, compared with the period when the A conversion period TA and the A+B conversion period TAB do not overlap.

Figure 5:
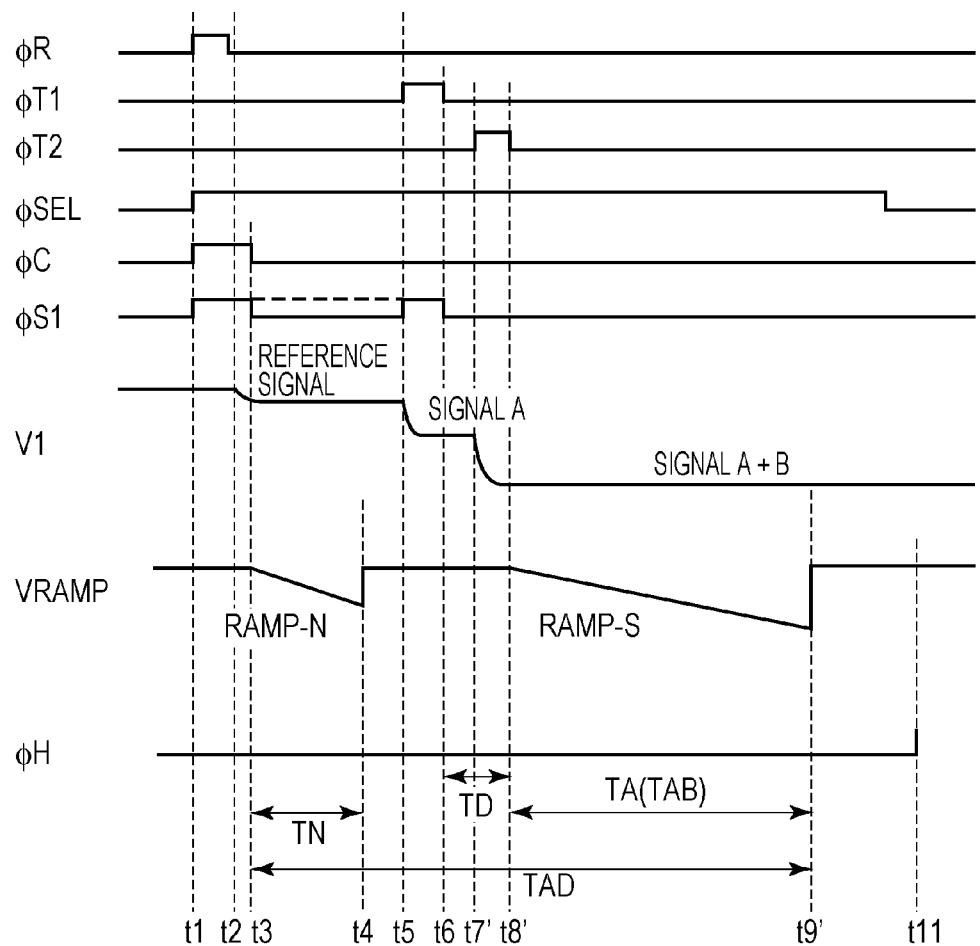
FIG. 5 is an operation timing chart associated with an image pickup apparatus according to another example.

Having described According to this embodiment that the reference signals VRAMP1 and VRAMP2 that are different from each other are supplied to the comparators 9-1 and 9-2, a common reference signal VRAMP may be supplied from the reference signal supplying circuit 10 to the comparators 9-1 and 9-2. FIG. 5 illustrates an operation of an image pickup apparatus having such a configuration.

The operations to be performed during the periods from the time t1 to the time t6 illustrated in the operation timing in FIG. 5 may be the same as the operations to be performed from the time t1 to the time t6 illustrated in the operation timing in FIG. 3. At a time t7' in the operation timing illustrated in FIG. 5, the transfer pulse φT2 is made to have an H level. This causes the signal A+B to be output to the vertical signal line 7. At a time t8', the transfer pulse φT2 is made to have an L-level.

At the time t8', the reference signal supplying circuit 10 starts changing the potential depending on the time of the reference signal VRAMP. The counter circuits 11-1 and 11-2 starts counting the clock pulse signals CLK supplied from the TG 12. At that time, the counter circuits 11-1 and 11-2 performs up-counting by using the count signal value held at the last N conversion as a starting value. The comparator 9-1 compares between the signal A and the reference signal VRAMP and output the latch signal LAT to the counter circuit 11-1 when the magnitude relationship is inverted. The comparator 9-2 compares between the signal A+B and the reference signal VRAMP and output the latch signal LAT to the counter circuit 11-2 when the magnitude relationship is inverted.

At a time t9', the reference signal supplying circuit 10 stops changing the potential depending on the time of the reference signal VRAMP.

Figure 4:
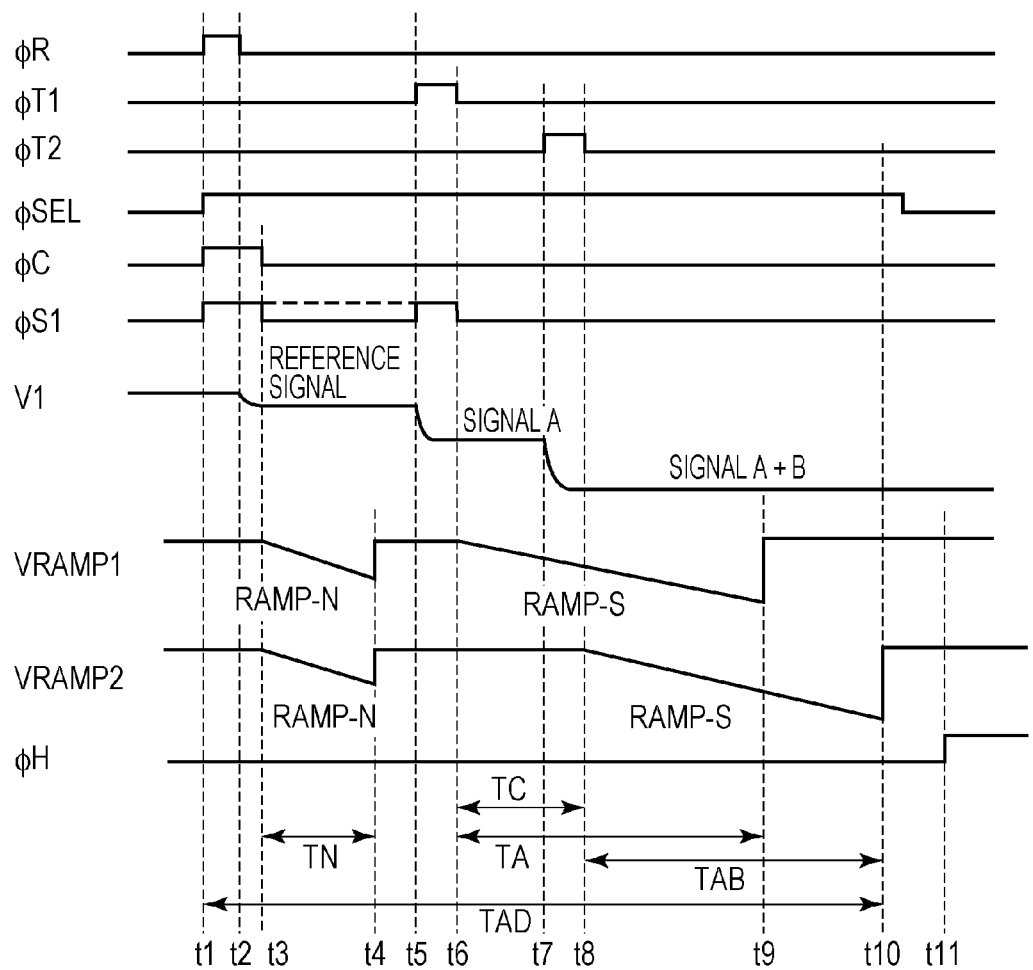
FIG. 4 is an operation timing chart for an image pickup apparatus.

The operation at a time t11 illustrated in FIG. 5 may be the same as the operation at the time t11 illustrated in FIG. 4.

In the operation timing illustrated in FIG. 4, a part of the A conversion period TA and a part of the A+B conversion period TAB overlap. In the operation timing illustrated in FIG. 5, the entire period of the A conversion period TA and the entire period of the A+B conversion period TAB overlap. The first period having this form includes the entire period of the A conversion period TA and the entire period of the A+B conversion period TAB. In this configuration, the period configuration the beginning of the A conversion period TA and the end of the A+B conversion period TAB may be shorten in the operation timing in FIG. 5 by a period TC illustrated in FIG. 4, compared with the operation timing in FIG. 4. The period TC illustrated in FIG. 4 is a period from the time t6 when the A conversion period TA starts to the time t8 when the A+B conversion period TAB starts. On the other hand, while the A conversion period TA starts at the time t6 in FIG. 4, the A conversion period TA (that is also the A+B conversion period TAB), starts at the time t8' which is later than the time t6 in the operation timing illustrated in FIG. 5. In other words, the A conversion period TA starts later by the length corresponding to the period TD illustrated in FIG. 5 in the operation timing illustrated in FIG. 5, compared with the operation timing illustrated in FIG. 4. This may shorten the period TC-TD that is a difference between the T period TC and the period TD in the AD conversion period TAD in the operation timing illustrated in FIG. 5, compared with the AD conversion period TAD in the operation timing illustrated in FIG. 4.

Having described that the capacitor CT is used as a capacitance that stores or holds the signal A in the image pickup apparatus of this embodiment, the capacitor CT may not be provided. In this configuration, because the potential at the time t6 is held on an electrical path from the switch SW6 to the input terminal of the comparator 9-1 also after the switch SW6 is turned off at the time t6, the signal A is supplied to the input terminal of the comparator 9-1. Therefore, this embodiment may be implemented without the capacitor CT. However, the image pickup apparatus of this embodiment has an effect that the capacitor CT may prevent instable potentials on the electrical path from the switch SW6 to the comparator 9-1 due to the ON and OFF operations on the switch SW6.

According to this embodiment, after the switch pulse φS1 is made to an L level at the time t3, it is made to an H level at the time t4. According to another embodiment, it may be made to an H level at the time t1 and may then be made to an L level at the time t6, without making to an L level at the time t3, as indicated by the broken lines in the operation timing charts in FIG. 4 and FIG. 5.

This embodiment is based on the configuration that the pixel 100 outputs the signal A+B that is a photoelectric conversion signal based on the signal charges of two photoelectric conversion units and the signal A that is a photoelectric conversion signal based on one photoelectric conversion unit. However, this embodiment is not limited to this configuration. In other words, each of a plurality of pixels may output a first photoelectric conversion signal based on the signal charges generated by m (m is a natural number) photoelectric conversion unit or units that the pixel has. The plurality of pixels having output the first photoelectric conversion signal may include m photoelectric conversion units and may further output second photoelectric conversion signal based on n (n is a natural number that is higher than m) photoelectric conversion units.

According to this embodiment, an image pickup apparatus has been described in which one microlens is provided correspondingly to one pixel for performing focal point detection. However, this embodiment is not limited to an image pickup apparatus that is capable of performing focal point detection. In other words, this embodiment may be implemented even when different microlenses are provided for the photodiode 1 and photodiode 51.

The pixel 100 of this embodiment may include a plurality of photodiodes that receive incident light and generate signal charges on basis of the received incident light and may output photoelectric conversion signals a plurality of number of times based on signal charges of the plurality of photodiodes. The photoelectric conversion signals output a plurality of number of times are signal A, signal B, and signal A+B in the configuration described according to this embodiment. The pixel 100 having many photodiodes may be capable of outputting more types of photoelectric conversion signal. The image pickup apparatus may be configured in which the first photoelectric conversion signal of a plurality of photoelectric conversion signals output by the pixel 100 is input to the first comparator and that a second photoelectric conversion signal of a plurality of photoelectric conversion signals is input to the second comparator. In this configuration, at least a part of the operation of comparing the first photoelectric conversion signal and the reference signal by the first comparator and at least a part of the operation of comparing the second photoelectric conversion signal and the reference signal by the second comparator may only be required to perform during the first period. This may advantageously shorten the AD conversion period TAD, compared with the configuration in which the second period and the third period do not overlap at all.

According to this embodiment, what is called a ramp type AD conversion has been described in which a reference signal that changes its potential depending on the time and the photoelectric conversion signal are compared. However, this embodiment may be implemented appropriately with AD conversions having other configurations. In other words, at least a part of the operation of converting the first photoelectric conversion signal to a digital signal may only be required to perform by the first analog-digital converting unit during the first period, and at least a part of the operation of converting the second photoelectric conversion signal to a digital signal may only be required to perform by the second analog-digital converting unit during the first period.

The image pickup apparatus of this embodiment may be capable of operating in the first mode where the pixels 100 output the signal A+N and signal A+B+N and in the second mode where they output the signal A+B+N without outputting the signal A+N. In the first mode, the image pickup apparatus may be operated on basis of the operation timing described with reference to FIG. 4 or FIG. 5. In the second mode, at least one of the comparators 9-1 and 9-2 may perform the AD conversion on the signal A+B. For example, because an operation of performing focal point detection operation while acquiring an image is performed in the first mode, it is suitable for taking moving images. The second mode is suitable for taking a still image.

As described above, in the image pickup apparatus of this embodiment, at least a part of the second period and at least a part of the third period overlap. This may advantageously shorten the AD conversion period TAD, compared with a case without a period when the second period and the third period overlap.

Second Embodiment

Hereinafter, an image pickup apparatus according to a second embodiment will be described with reference to drawings and mainly with regard to differences from the first embodiment.

Figure 6:
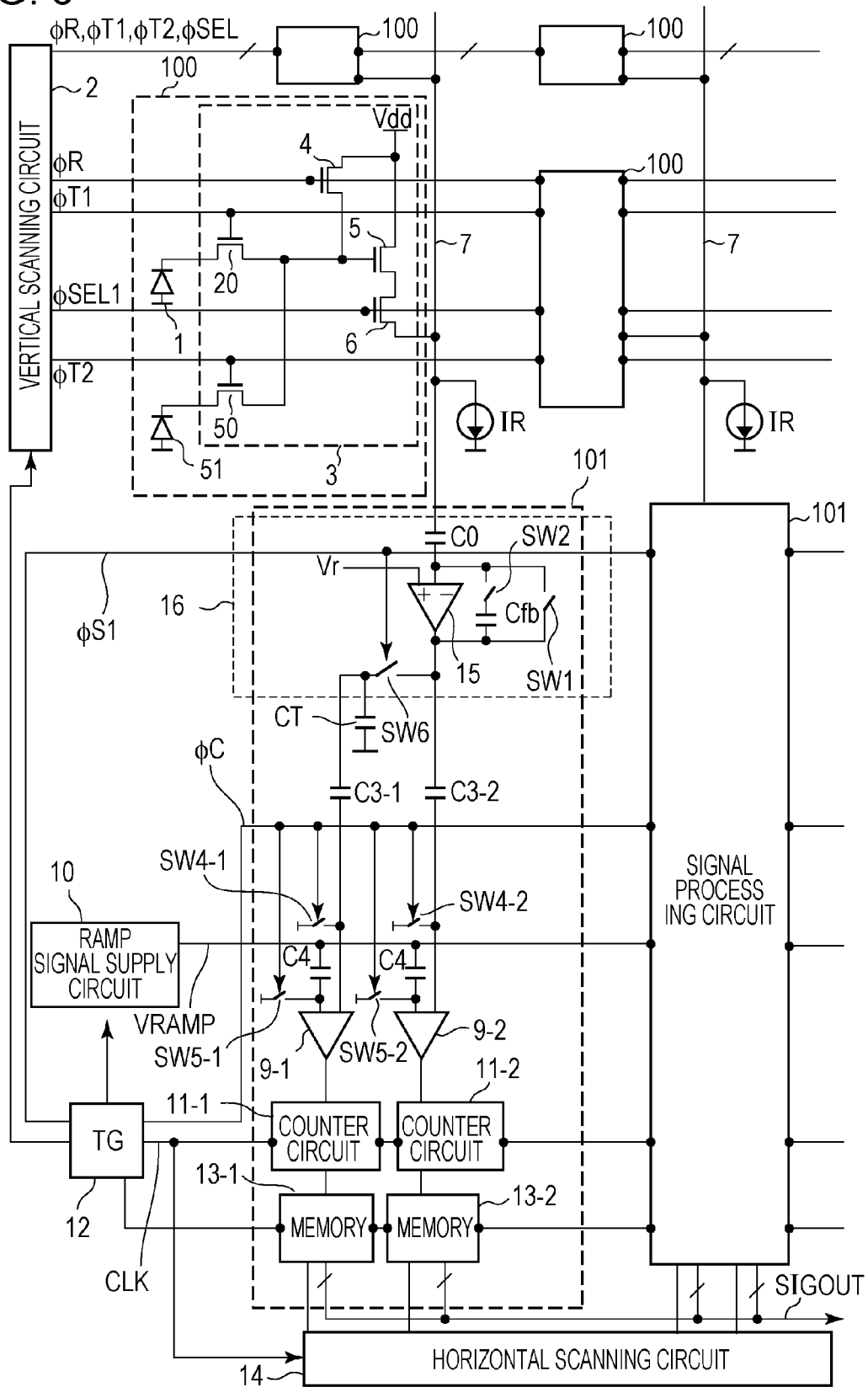
FIG. 6 is an equivalent circuit diagram of an image pickup apparatus according to another example.

FIG. 6 illustrates an example of an equivalent circuit diagram of an image pickup apparatus according to this embodiment. Like numbers refer to like elements having like functions In FIG. 3 and FIG. 6.

An image pickup apparatus of this embodiment is different from the image pickup apparatus of the first embodiment in that an inverting amplifier circuit 16 including an operational amplifier 15 is provided in each column having the pixels 100. The inverting amplifier circuit 16 has the operational amplifier 15, feedback capacitor Cfb, a clamp capacitor C0, and switches SW1 and SW2. A pixel signal output by the pixel 100 is supplied to an inverting input terminal of the operational amplifier 15 through the clamp capacitor C0. A signal Vr is supplied to a noninverting input terminal of the operational amplifier 15. The feedback capacitor Cfb and switch SW2 are provided on a feedback path in the operational amplifier 15. When the switch SW2 is ON, an inverting gain according to the ratio between the capacitance value of the feedback capacitor Cfb and the capacitance value of the clamp capacitor C0 occurs at an output terminal of the operational amplifier 15. Turning on the switch SW1 and shorting out the output terminal and input terminal of the operational amplifier 15 resets charges held in the feedback capacitor Cfb. Illustrating one feedback capacitor Cfb in FIG. 6, a plurality of capacitors may be provided in parallel on a feedback path of the operational amplifier 15, and a feedback capacitance to be used may be selected from the plurality of capacitors. When the switch SW6 is ON, the signal output by the operational amplifier 15 is held in the capacitor CT and is further output to the input terminal of the comparator 9-1. The signal output by the operational amplifier 15 is output to the clamp capacitor C3-2 through the comparator 9-2.

Next, an example of an operation of the image pickup apparatus illustrated in FIG. 6 will be described with reference to FIG. 7.

Figure 7:
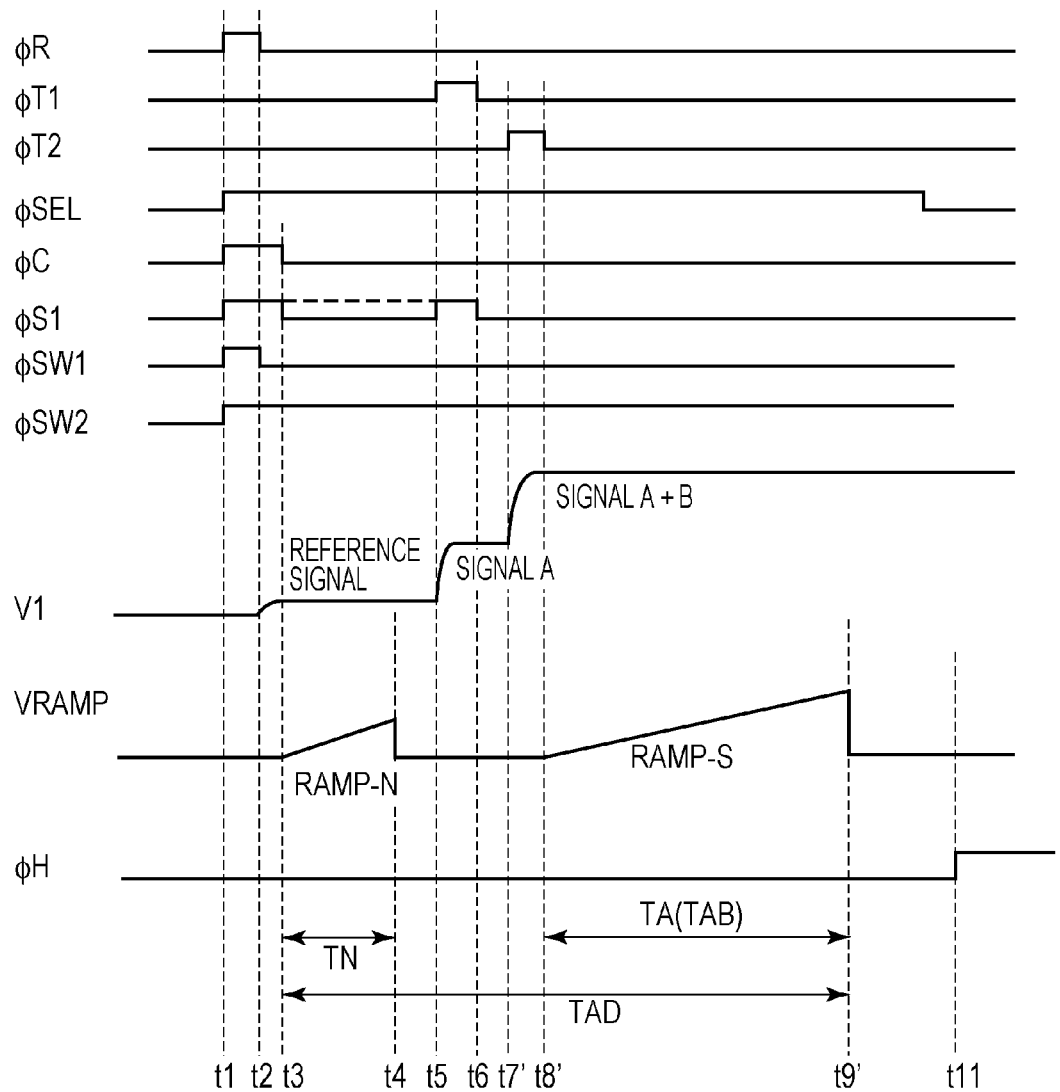
FIG. 7 is an operation timing chart for an image pickup apparatus according to another example.

The output terminal of the operational amplifier 15 has a potential V1' in FIG. 7. According to this embodiment, a pixel signal is inverted and amplified by the inverting amplifier circuit 16 and is output to the comparators 9-1 and 9-2. Thus, the potential V1' according to this embodiment results in a signal having the opposite polarity against that of the potential V1 of the first embodiment. The direction in which the reference signal VRAMP changes its potential dependently on time is also the opposite against that of the first embodiment.

At a time t1, the switch pulses φSW1 and φSW2 are made to an H level to bring the switches SW1 and SW2 into conduction.

At a time t2, a reset pulse φR and a switch pulse φSW1 are made to have an L-level. A switch pulse φSW1 is made to have an L-level so that the signal N output by the pixel 100 is held in the capacitor C0. Thus, a reference signal containing an offset component of the operational amplifier 15 is output to the output terminal of the operational amplifier 15.

At a time t3, a signal processing circuit reset pulse φC is made to have an L-level. Thus, a reference signal containing an offset component of the operational amplifier 15 is held in the clamp capacitors C3-1 and C3-2.

During a period from the time t3 to a time t4, the comparators 9-1 and 9-2 compare signals input from the operational amplifier 15 through the clamp capacitor C3-1, C3-2 and a reference signal VRAMP.

Also during a period from a time t8' to a time t9', the comparators 9-1 and 9-2 compare signals input from the operational amplifier 15 through the clamp capacitors C3-1 and C3-2 and the reference signal VRAMP.

Except for these features, the operation timing illustrated in FIG. 7 may be the same as the operation timing in FIG. 5 according to the first embodiment.

The clamp capacitors C3-1 and C3-2 of this embodiment store or hold the reference signal containing the offset component of the operational amplifier 15 at the time t3. Storing or holding the reference signal containing the offset component in the clamp capacitors C3-1 and C3-2 may generate signals to be supplied to the comparators 9-1 and 9-2 at the time t6 and time t8' from which the reference signal are subtracted. This may reduce the deterioration of image quality due to variations of the offset component of the operational amplifier 15 among the columns.

As a result of N conversions performed by the comparators 9-1 and 9-2 and subtraction of them from a digital signal acquired by an S conversion, the deterioration of the image quality due to variations of the operation between comparators may be reduced.

The image pickup apparatus of this embodiment has an A conversion period TA and an A+B conversion period TAB that partially overlap, like the image pickup apparatus according to the first embodiment. This may advantageously shorten the AD conversion period TAD, compared with a case without a period when the A conversion period TA and A+B conversion period TAB do not overlap.

This embodiment may be configured such that reference signals VRAMP1 and VRAMP2 may be supplied separately to the comparators 9-1 and 9-2, like the image pickup apparatus illustrated in FIG. 3. Even in this configuration, operations may be performed in the same manner as those based on the operation timing chart illustrated in FIG. 4 of the first embodiment. In this configuration, at least a part of the A conversion period TA and at least a part of the A+B conversion period TAB overlap. This may advantageously shorten the AD conversion period TAD, compared with a case where the A conversion period TA and A+B conversion period TAB do not overlap.

Also according to this embodiment, the switch pulse φS1 may be made to an H level at the time t1 and may then be made to an L level at the time t6, without making to an L level at the time t3, as indicated by the broken lines in the operation timing chart in FIG. 7.

Third Embodiment

Hereinafter, an image pickup apparatus according to a third embodiment will be described with reference to drawings and mainly with regard to differences from the second embodiment.

Figure 8:
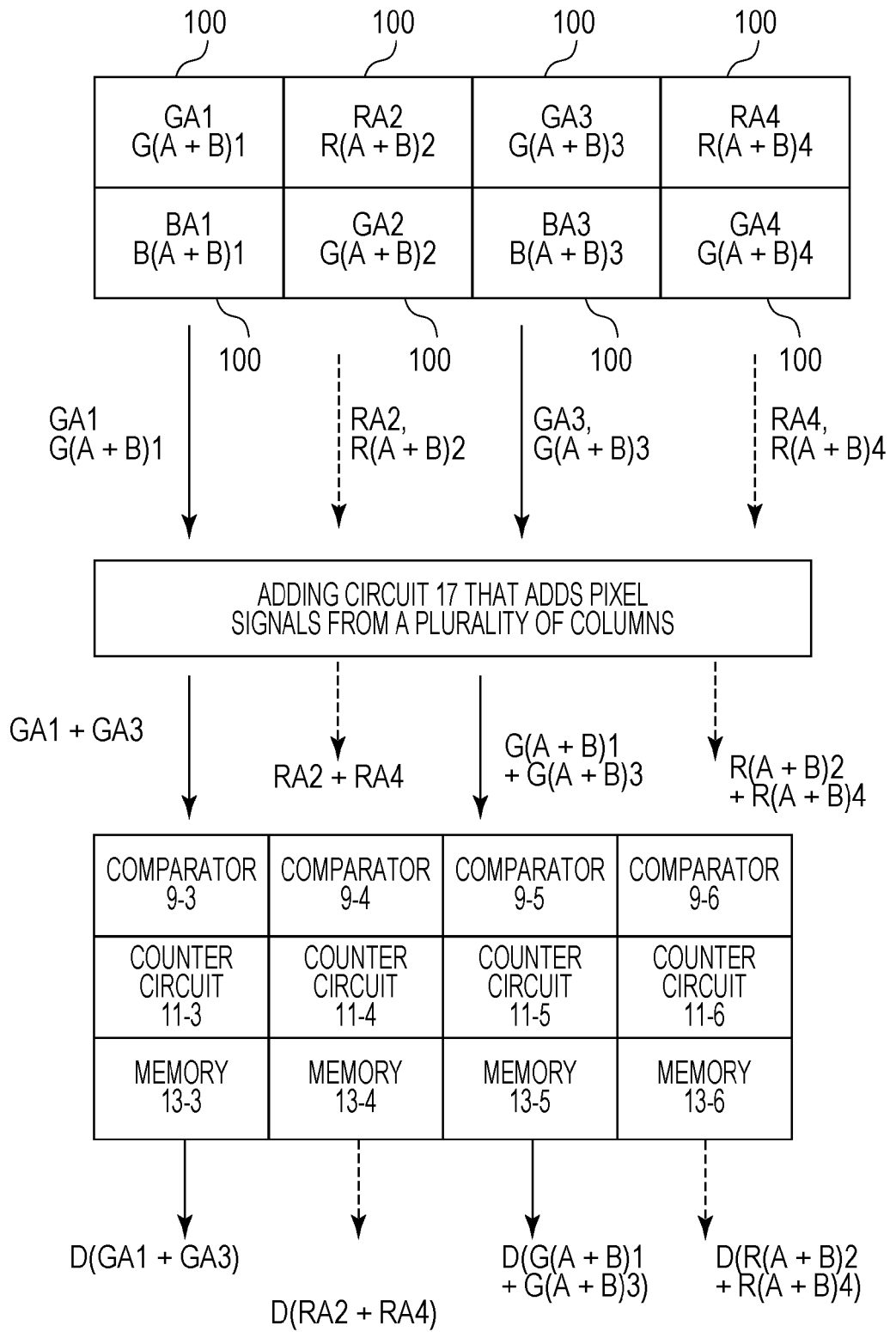
FIG. 8 is a block diagram of an image pickup apparatus according to another example.

FIG. 8 is a block diagram schematically illustrating an image pickup apparatus of this embodiment. FIG. 8 illustrates 2-rows and 4-columns of pixels 100 out of a plurality of rows and a plurality of columns of pixels 100 and further illustrates a case where a pixel signal is output from the pixels 100 at the first row. Each of the pixels 100 has color filters, as described according to the first embodiment with reference to FIG. 2. The color filters are red (R), green (G), and blue (B). These three-color color filters are in Bayer arrangement. FIG. 8 illustrates pixel signals output by the pixels 100 by using colors of the color filters, photoelectric conversion signals (signal A and signal A+B) to be output, columns on which pixels are provided (columns counted from the left of FIG. 8. The expression "Xth column" in the Specification refers to the column counted from the left unless otherwise indicated.) For example, the signal A and signal A+B output from the pixels 100 provided at the first row and the first column are denoted with GA1 and G(A+B)1, respectively. They indicate signal A and signal A+B output by the pixel 100 having the green (G) color filter and pixel signals output from the pixels 100 at the first column counted from the left of the pixel columns illustrated in FIG. 8.

The pixels 100 at the first row output pixel signals to the adding circuit 17. The adding circuit 17 adds signals A and signals A+B from a plurality of pixels 100 having the color filters of same color as each other. In other words, first photoelectric conversion signals output by a plurality of pixel 100 are added and second photoelectric conversion signals output by the plurality of pixel 100 are added. The pixels 100 having color filters for green add signals A to each other and signals A+B to each other from the pixels 100 at the first column and the third column, and the two signals resulting from the additions are output to separate comparators. In other words, a signal GA1+GA3 resulting from the addition of the signal GA1 and the signal GA3 is output to a comparator 9-3. A signal G(A+B)1+G(A+B)3 resulting from the addition of the signal G(A+B)1 and the signal G(A+B)3 is output to a comparator 9-5. The signal GA1+GA3 output to the comparator 9-3 is converted to a digital signal by the AD conversion operation described with reference to FIG. 5 according to the first embodiment and is output to the memory 13-3. The digital signal output from the memory 13-3 will be called a D(GA1+GA3). In the same manner, the signal G(A+B)1+G(A+B)3 input to the comparator 9-5 is converted to a digital signal by the AD conversion operation and is output from the memory 13-5. The digital signal will be called a D(G(A+B)1+G(A+B)3).

From pixel signals output from the pixels 100 having green color filters at the first column and third column have been described up to this point. In the same manner, pixel signals output from the pixels 100 having red color filters at the second column and fourth column, a memory 13-4 outputs a digital signal D(RA2+RA4), and a memory 13-6 outputs a digital signal D(R(A+B)2+R(A+B)4).

Figure 9:
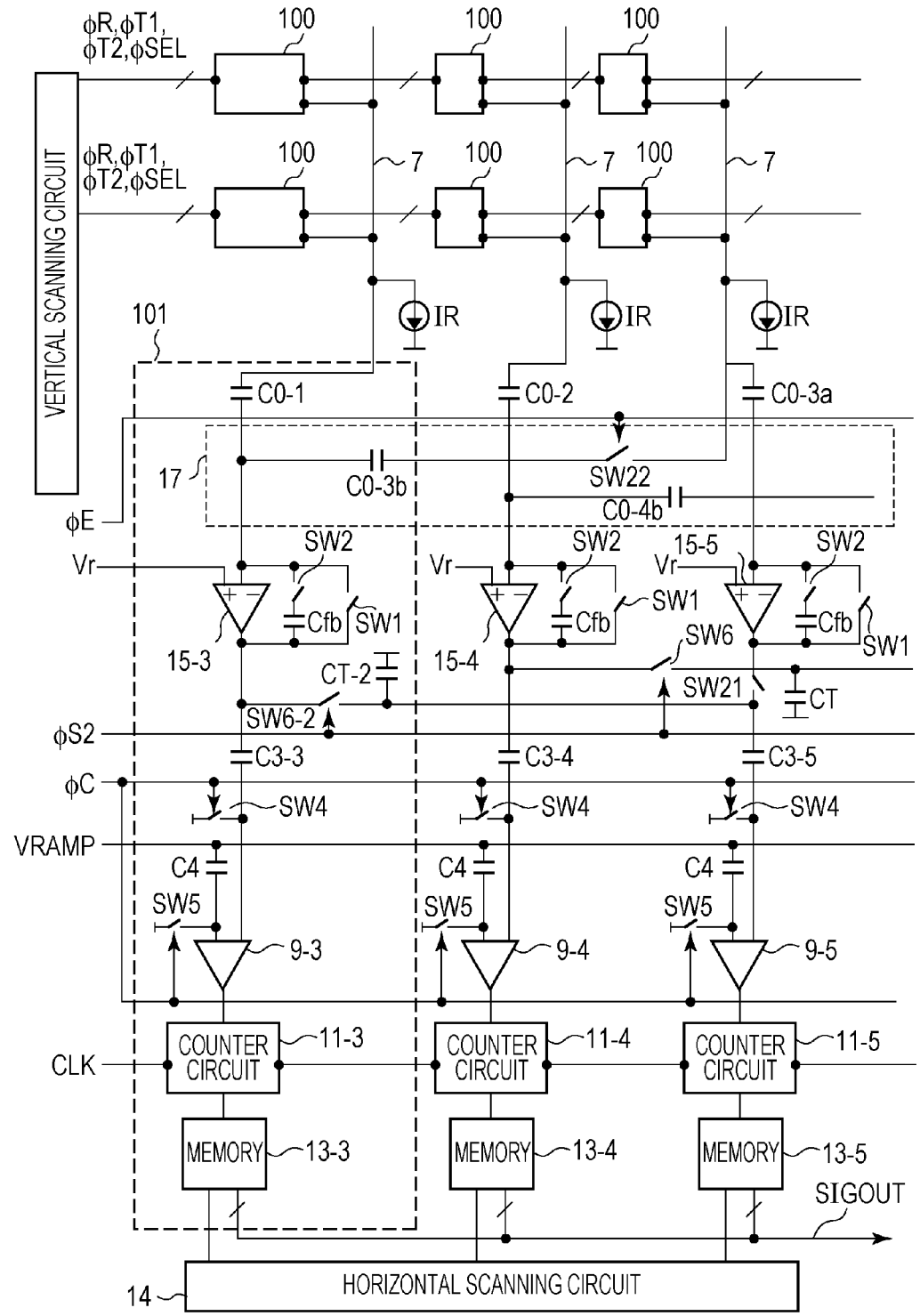
FIG. 9 is an equivalent circuit diagram of an image pickup apparatus according to another example.

FIG. 9 is an equivalent circuit diagram illustrating details of the image pickup apparatus that is schematically illustrated in the block diagram in FIG. 8. FIG. 9 illustrates pixels 100 at two rows and three columns out of the pixels 100 at two rows and four columns illustrated in FIG. 8. Like numbers refer to like elements having like functions in FIG. 5 and FIG. 9.

The pixels 100 and signal processing circuits 101 at a first column and a third column will be described below mainly with regard to differences from those in FIG. 6 according to the second embodiment. The same as the pixels 100 and signal processing circuits 101 at the first column and third column is true for pixels 100 and signal processing circuits 101 at a second column and fourth column, not illustrated. While two comparators are provided for one column of the pixels 100 according to the first and second embodiments, one comparator is provided for one column of pixels 100 according to this embodiment.

The pixels 100 at the first column are electrically connected to an inverting input terminal of an operational amplifier 15-3 through a clamp capacitor C0-1. The pixels 100 at the third column are electrically connected to the operational amplifier 15-3 through a switch SW22 and a clamp capacitor C0-3b. The pixels 100 at the third column are electrically connected to an operational amplifier 15-5 through a clamp capacitor C0-3a. However, a case will be described according to this embodiment where a switch SW21 is turned off and no signal output from the operational amplifier 15-5 is supplied to the comparator 9-5. A signal that controls an operation of the switch SW21 is not illustrated.

A signal output from the operational amplifier 15-3 is supplied to the comparator 9-3 through a clamp capacitor C3-3. The clamp capacitor C3-3 operates similarly to the clamp capacitor C3-1 described with reference to FIG. 6 according to the second embodiment. When a switch SW6-2 is ON, a signal output from the operational amplifier 15-3 is held in a capacitor CT-2 via the switch SW6-2 and is supplied to the comparator 9-5 through the clamp capacitor C3-5.

For example, a photoelectric conversion signal output from the pixels 100 at the first column is given to a first analog-digital converting unit and a second analog-digital converting unit. The first analog-digital converting unit includes the comparator 9-3, a counter circuit 11-3, and a memory 13-3. The second analog-digital converting unit includes the comparator 9-5, a counter circuit 11-5, and a memory 13-5.

Figure 10:
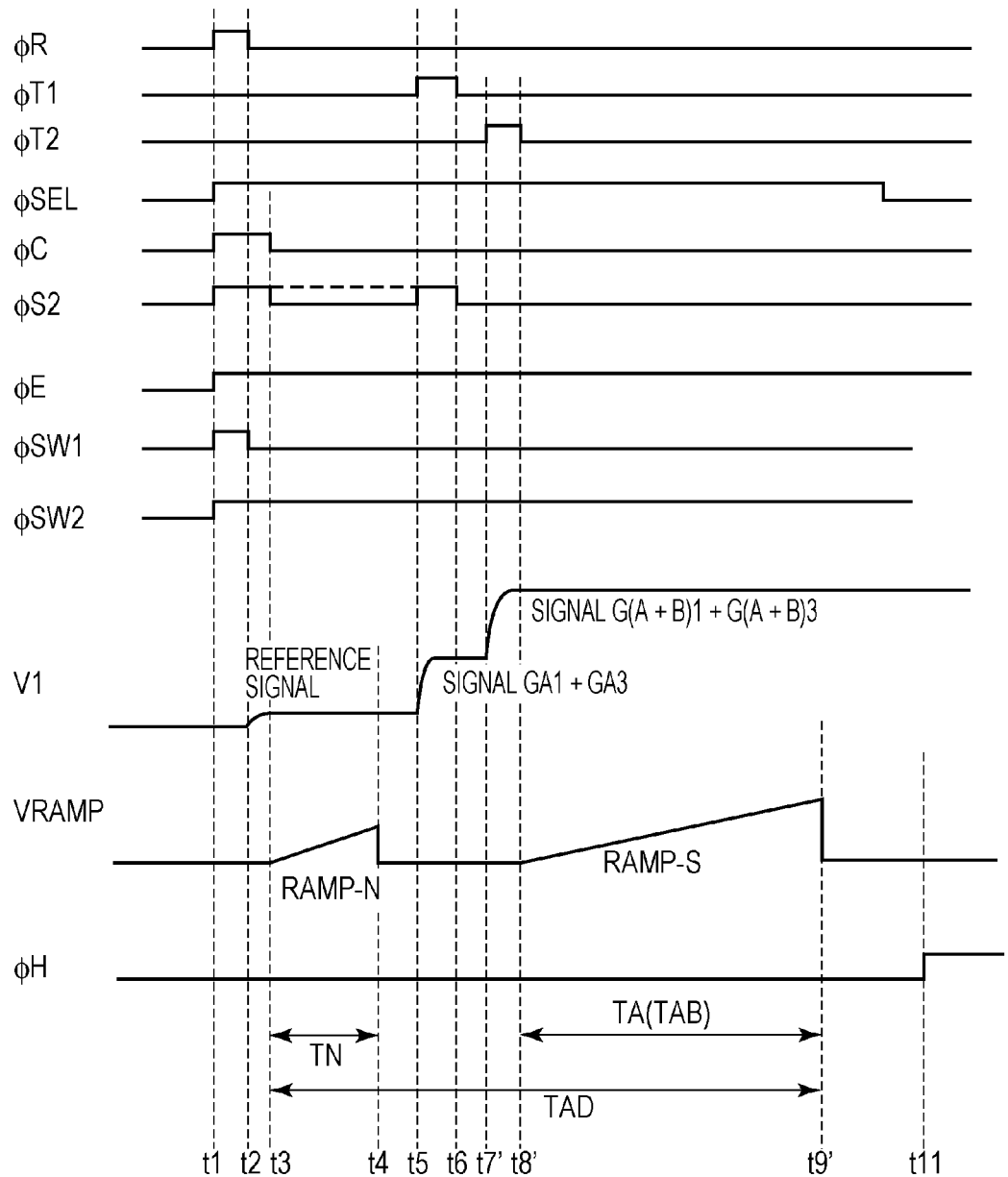
FIG. 10 is an operation timing chart for an image pickup apparatus according to another example.

Next, operations of the image pickup apparatus illustrated in FIG. 9 will be described mainly with reference to FIG. 10 and with regard to differences from that in FIG. 7 according to the second embodiment.

A switch pulse φE is a pulse that controls the switch SW22, and when it has an H level, the switch SW22 is brought into conduction. A switch pulse φS2 is a pulse that controls the switch SW6-2 and when it has an H level, the switch SW6-2 is brought into conduction.

At a time t1, the switch pulse φE is made to have an H level. Other operations to be performed during a period from the time t1 to a time t11 may be the same as the operations performed during the period from the time t1 to the time t11 in FIG. 7 according to the second embodiment. Signals to be input to the operational amplifier 15-3 and comparators 9-3 and 9-5 and signals to be output from them will be described below.

At a time t1, the switch pulses φSW1 and φSW2 are made to have an H level to bring the switch SW1 into conduction.

At a time t2, a reset pulse φR and a switch pulse φSW1 are made to have an L-level. The switch pulse φSW1 is made to have an L-level, and the signals N(GN1) output from the pixels 100 at the first column are thus held in the capacitor C0-1. The signals N(GN3) output from the pixels 100 at the third column are held in the capacitor C0-3b. Thus, a reference signal containing an offset component of the operational amplifier 15-3 is output to an output terminal of the operational amplifier 15-3.

At a time t3, the signal processing circuit reset pulse φC is made to have an L-level. Thus, a reference signal containing an offset component of the operational amplifier 15-3 is held in the capacitors C3-3 and C3-5. At the time t3, the switch pulse φS2 is made to have an L-level. A reference signal containing an offset component output by the operational amplifier 15-3 at the time t3 is held in the capacitor CT-2.

During the period from the time t3 to a time t4, the comparators 9-3 and 9-5 compare between signals input from the operational amplifier 15-3 through the clamp capacitors C3-3 and C3-5 and a reference signal VRAMP.

The reference signal supplying circuit 10 starts changing the potential depending on the time of the reference signal VRAMP. The comparators 9-3 and 9-5 compare between a signal resulting from subtraction of the reference signal from the signal output from the operational amplifier 15-3 and the reference signal VRAMP.

The operation at the time t4 is the same as the operation at the time t4 in FIG. 7 according to the second embodiment.

At a time t5, a transfer pulse φT1 and a switch pulse φS2 are made to have an H level. Thus, the pixels 100 output a signal GA1 and a signal GA3 to the vertical signal line 7. Because the switch SW22 is ON, the operational amplifier 15-3 receives a signal resulting from subtraction of a signal GN1+GN3 held in the clamp capacitors C0-1 and C0-3b from a signal GA1+GA3 that is a sum of the signal GA1 and the signal GA3. Because the switch SW6-2 is ON, the signal output from the operational amplifier 15-3 is supplied to the comparator 9-5 through the capacitor CT-2 and clamp capacitor C3-5.

At a time t6, a transfer pulse φT1 and a switch pulse φS2 are made to have an L-level. The signal GA1+GA3 is held in the capacitor CT-2.

At a time t7', a transfer pulse φT2 is made to have an H level. Thus, the pixels 100 output the signal G(A+B)1 and signal G(A+B)3 to the vertical signal line 7. Because the switch SW22 is ON, the operational amplifier 15-3 receives a signal resulting from subtraction of a signal GN1+GN3 held in the clamp capacitors C0-1 and C0-3b from a signal G(A+B)1+G(A+B)3 that is a sum of the signal G(A+B)1 and the signal G(A+B)3. The signal output from the operational amplifier 15-3 is supplied to the comparator 9-3 through the clamp capacitor C3-3 because the switch SW6-2 is OFF.

At a time t8', the transfer pulse φT2 is made to have an L-level. The reference signal supplying circuit 10 then starts changing the potential depending on the time of the reference signal VRAMP. The comparator 9-3 compares between a signal output from the operational amplifier 15-3 through the clamp capacitor C3-3 and the reference signal VRAMP. The comparator 9-5 compares between a signal output from the operational amplifier 15-3 through the clamp capacitor C3-5 and the reference signal VRAMP.

At a time t9', the reference signal supplying circuit 10 finishes changing the potential depending on the time of the reference signal VRAMP. The memory 13-3 holds a digital signal based on a signal input from the operational amplifier 15-3 through the clamp capacitor C3-3 to the comparator 9-3. The digital signal is based on the signal G(A+B)1+G(A+B)3. The memory 13-5 holds a digital signal based on a signal input from the operational amplifier 15-3 through the clamp capacitor C3-5 to the comparator 9-5. The digital signal is based on the signal GA1+GA3.

Up to this point, the operations of the pixels 100 at the first column and third column have been described. The pixels 100 at the second column and fourth column perform the same operations as the pixels 100 at the first and third columns.

The image pickup apparatus of this embodiment has an A conversion period TA and an A+B conversion period TAB overlapped, like the image pickup apparatus according to the second embodiment. This may advantageously shorten the AD conversion period TAD, compared with a case where the A conversion period TA and the A+B conversion period TAB do not overlap.

This embodiment may have a configuration in which different ramp signals VRAMP1 and VRAMP2 are supplied separately to the comparators 9-3 and 9-5, like the image pickup apparatus illustrated in FIG. 3. Even this configuration may allow the same operations as in the operation timing chart in FIG. 4 according to the first embodiment. In this configuration, at least a part of the A conversion period TA and at least a part of the A+B conversion period TAB overlap. This may advantageously shorten the AD conversion period TAD, compared with a case where the A conversion period TA and the A+B conversion period TAB do not overlap. An N conversion may be performed individually by the comparators 9-1 and 9-2, the result of which may be subtracted from the digital signal acquired by an S conversion. This may reduce the deterioration of image quality due to variations in the operations by the comparators.

Also according to this embodiment, the switch pulse φS2 may be made to an H level at the time t1 and may then be made to an L level at the time t6, without making to an L level at the time t3, as indicated by the broken lines in the operation timing chart in FIG. 7.

Pixel signals at a plurality of columns may be added as analog signals or added as digital signals. In this embodiment, analog signals thereof are added. The addition of analog signals may implemented by (1) commonly connecting input nodes of amplify MOS transistors with a plurality of pixels or (2) adding signals output by the pixels. The latter form may include adding signals at inputs of the operational amplifiers or adding signals at inputs of comparators. According to this embodiment, signals are added at the inputs of the operational amplifiers. This embodiment may advantageously reduce power consumption of the image pickup apparatus by reducing the current to be supplied to an operational amplifier (the operational amplifier 15-5 in this embodiment) or cutting it to zero because of the addition as analog signals according to this embodiment. A configuration having an adding circuit that adds signals at the input of comparators may properly implement this embodiment.

According to this embodiment, the adding circuit adds pixel signals output to different signal lines. Alternatively, photoelectric conversion units of a plurality of pixels 100 may be connected to an input node of one amplify MOS transistor 5 of a pixel 100. Thus, a pixel signal based on signal charges generated by the photoelectric conversion units of the plurality of pixels 100 may be output. The signal based on signal charges generated by the photoelectric conversion units of a plurality of pixels 100 may correspond to the signal as a result of addition of pixel signals output by a plurality of pixels 100, as in this embodiment.

According to this embodiment, the adding circuit adds pixel signals output by a plurality of pixels 100. However, the image pickup apparatus of this embodiment may further has a mode in which the pixel signals output by a plurality of pixels 100 are supplied to the comparator 9 without being added. In other words, the image pickup apparatus may further has a mode in which pixel signals output by pixels 100 at columns are supplied to the comparator 9. As an example of this configuration, the image pickup apparatus in FIG. 8 is configured such that pixel signals outputs by pixels at the first column are output to the comparator 9-3, and pixel signals output by pixels at the second column are output to the comparator 9-4. An another example, the pixel signal output by pixels at the first column may be output to the comparator 9-5, and pixel signals output by pixels at the second column may be output to the comparator 9-6. In other words, the image pickup apparatus may operate in a first mode in which a plurality of pixels output a signal A that is a first photoelectric conversion signal to the first analog-digital converting unit and output a signal A+B that is a second photoelectric conversion signal to the second analog-digital converting unit and in a second mode in which a plurality of pixels do not output the signal A but output the signal A+B to at least one of the first analog-digital converting unit and the second analog-digital converting unit. In the first mode, the first analog-digital converting unit performs at least a part of the operation of converting the first photoelectric conversion signal to a digital signal during the first period and the second analog-digital converting unit performs at least a part of the operation of converting the second photoelectric conversion signal to a digital signal during the first period. In the second mode, at least one of the first analog-digital converting unit and the second analog-digital converting unit to which the signal A+B is supplied performs the operation of converting the signal A+B to a digital signal. Even in this configuration, at least partial overlap of the A conversion period TA and the A+B conversion period TAB in the first mode may advantageously shorten the AD conversion period TAD, compared with a case where the A conversion period TA and the A+B conversion period TAB do not overlap. This may allow uses of the first mode and the second mode in accordance with applications. For example, movie photographing may be performed in the first mode while a focal point detection operation is being performed, and movie photographing may be performed in the second mode without performing still image photographing or a focal point detection operation.

Alternatively, pixels 100 at one of the first column and the third column, such as pixels 100 from the first column may output photoelectric conversion signals. In this configuration, the signal A output by the pixels at the first column may be supplied to the comparator 9-3, for example, at the first column while the signal A+B may be supplied to the comparator 9-5 at the third column, for example. The comparator 9-3 at the first column and the comparator 9-5 at the third column may perform comparison operations in parallel so that the same effect as the effect of this embodiment may be acquired. In this configuration, a current source and the operational amplifier 15-5 on the vertical signal line 7 at the third column may be disabled. This may reduce power consumption of the image pickup apparatus. The configuration in which a current source and the operational amplifier 15-5 on the vertical signal line 7 at the third column is disabled does not require an adding circuit but may only require the signal A and the signal A+B from the pixels 100 at the first column to be supplied to different comparators.

Fourth Embodiment

According to a fourth embodiment, the image pickup apparatus according to the first embodiment is applied to an image pickup system. The image pickup system may be a digital still camera, a digital camcorder, a monitor camera or the like. FIG. 11 is a schematic diagram when the image pickup apparatus is applied to a digital still camera that is an example of an image pickup system.

The image pickup system illustrated in FIG. 11 has a barrier 151 for lens protection, a lens 152 that forms an optical image of a subject in the image pickup apparatus 154 and an aperture 153 for making the illuminance through the lens 152 variable. The lens 152 and aperture 153 is an optical system that condenses light to the image pickup apparatus 154. The image pickup system illustrated in FIG. 11 further has an output signal processing unit 155 which processes a signal output from the image pickup apparatus 154.

The output signal processing unit 155 has a digital signal processing unit where a difference processing is performed in which a digital signal N is subtracted from the digital signal A and digital signal A+B output from the image pickup apparatus 154. The output signal processing unit 155 further perform difference processing in which a difference signal is acquire by calculating the difference between the digital signal A+B and digital signal A based on the signal A+B and signal A from one pixel. The difference signal corresponds to a digital signal B. The output signal processing unit 155 may further perform other operations including correcting and/or compressing a signal before output as necessary.

The image pickup system illustrated in FIG. 11 may further include a buffer memory unit 156 which temporarily stores image data and an external interface unit 157 for communicating with an external computer, for example. The image pickup system may further include a recording medium 159 removably attached to a semiconductor memory or the like for recording or reading image data thereto or therefrom and a recording medium control interface unit 158 for recording or reading to or from the recording medium 159. The image pickup system further includes a general control/operating unit 1510 which performs operations and generally controls a digital still camera and a timing generating unit 1511 which outputs timing signals to the image pickup apparatus 154 and output signal processing unit 155. In this case, the timing signals may be externally input, and the image pickup system may only has at least the image pickup apparatus 154 and the output signal processing unit 155 which processes signals output from the image pickup apparatus 154.

The processing to be performed by the output signal processing unit 155 in which the digital signal A and the digital signal A+B from which a difference is calculated are output from one pixel. In other words, the difference processing is performed between a focal-point detection signal based on the signal A output from the pixel 100 and an image acquisition signal based on the signal A+B output from the pixel 100 that has output the focal-point detection signal. This may provide a signal based on the signal B from the pixel 100. Comparing the signal and the signal based on the signal A in signal value may implement a focal point detect by using a phase difference detection. The output signal processing unit 155 forms an image on basis of the signal acquired by subtracting a digital signal N from the digital signal A+B that is an image acquisition signal.

In this way, the image pickup system according to this embodiment may perform a focal point detection operation and an imaging operation by applying the image pickup apparatus 154.

One disclosed feature of the embodiments may be described as a process which is usually depicted as a timing diagram. A timing diagram may illustrate the timing relationships of several entities, such as signals, events, etc. Although a timing diagram may describe the operations as a sequential process, some operations may be performed in parallel or concurrently. In addition, unless specifically stated, the order of the operations or timing instants may be re-arranged. Furthermore, the timing or temporal distances may not be scaled or depict the timing relationships in exact proportions.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2012-045652, filed Mar. 1, 2012, which is hereby incorporated by reference herein in its entirety.

What is claimed is:

1. An image pickup apparatus comprising:
a pixel including at least a first photoelectric conversion unit and a second photoelectric conversion unit which is different from the first photoelectric conversion unit;
a first analog-digital converting unit that performs at least a part of an operation of converting a first photoelectric conversion signal of the first photoelectric conversion unit to a first digital signal during a first period; and
a second analog-digital converting unit that performs at least a part of an operation of converting a second photoelectric conversion signal of the second photoelectric conversion unit to a second digital signal during the first period.

2. The image pickup apparatus according to claim 1, further comprising a plurality of pixels and an adding circuit, wherein:

the plurality of pixels output the photoelectric conversion signals to the adding circuit; and the adding circuit outputs a signal in which the adding circuit adds the first photoelectric conversion signals output from the different pixels, to the first analog-digital converting unit, and outputs a signal in which the adding circuit adds the second photoelectric conversion signals output from the different pixels, to the second analog-digital converting unit.

3. The image pickup apparatus according to claim 2, wherein each of the pixels further has a color filter; and the adding circuit adds the first photoelectric conversion signals output from the plurality of pixels which have the color filters of same color as each other and are arranged at different columns, the adding circuit adds the second photoelectric conversion signals output from the plurality of pixels which have the color filters of same color as each other and are arranged at different columns.

4. The image pickup apparatus according to claim 1, further comprising an amplifier circuit, wherein the amplifier circuit amplifies the first photoelectric conversion signal and outputs it to the first analog-digital converting unit and amplifies the second photoelectric conversion signal and outputs it to the second analog-digital converting unit.

5. The image pickup apparatus according to claim 4, further comprising a plurality of columns having the pixels and a plurality of signal lines each of which is provided for each of the columns, wherein the first analog-digital converting unit is provided correspondingly to a column having a first pixel;

the second analog-digital converting unit is provided correspondingly to a column having a second pixel at the column that is different from the column having the first pixel;

a first amplifier circuit is provided on an electrical path between the first pixel and the first analog-digital converting unit;

a second amplifier circuit that is different from the first amplifier circuit is provided on an electrical path between the second pixel and the second analog-digital converting unit;

a signal resulting from amplification of the first photoelectric conversion signal from the first pixel is output from the first amplifier circuit to the first analog-digital converting unit and a signal resulting from amplification of the second photoelectric conversion signal from the first pixel is output from the first amplifier circuit to the second analog-digital converting unit; and the second amplifier circuit is disabled while the first pixel is outputting the first photoelectric conversion signal or the second photoelectric conversion signal.

6. The image pickup apparatus according to claim 1, further comprising a plurality of the pixels and a plurality of signal lines, wherein the pixels output the photoelectric conversion signals to the first analog-digital converting unit and the second analog-digital converting unit through the signal lines; and both of the first analog-digital converting unit and the second analog-digital converting unit are provided for each of the signal lines.

7. The image pickup apparatus according to claim 1, further comprising a plurality of columns having the pixels and a plurality of signal lines each of which corresponds to each of the columns;

wherein the first analog-digital converting unit and the second analog-digital converting unit are provided at the different columns from each other; and the second photoelectric conversion signal is output to the second analog-digital converting unit from the pixel that outputs the first photoelectric conversion signal to the first analog-digital converting unit.

8. The image pickup apparatus according to claim 7, wherein the first analog-digital converting unit is provided correspondingly to a column having a first pixel;

the second analog-digital converting unit is provided correspondingly to a column having a second pixel;

the first pixel outputs the first photoelectric conversion signal to the first analog-digital converting unit, and the first pixel outputs the second photoelectric conversion signal to the second analog-digital converting unit; and a current source that supplies current to the signal line at the column having the second pixel is disabled while the first pixel is outputting the first photoelectric conversion signal or the second photoelectric conversion signal.

9. The image pickup apparatus according to claim 1, wherein each of the first analog-digital converting unit and the second analog-digital converting unit has a comparator that outputs a comparison result signal based on a result of comparison between the photoelectric conversion signal and a reference signal which changes its potential depending on the time;

during the first period, a first comparator included in the first analog-digital converting unit performs at least a part of an operation of comparing the first photoelectric conversion signal and a reference signal; and a second comparator included in the second analog-digital converting unit performs at least a part of an operation of comparing the second photoelectric conversion signal and a reference signal.

10. The image pickup apparatus according to claim 1, wherein a whole period when the second analog-digital converting unit performs an operation of converting the second photoelectric conversion signal to the second digital signal includes a whole period when the first analog-digital converting unit performs an operation of converting the first photoelectric conversion signal to the first digital signal.

11. The image pickup apparatus according to claim 1, further comprising a microlens, wherein the microlens causes the light beams condensed by the microlens to enter to both of the first photoelectric conversion unit and the second photoelectric conversion unit.

12. An image pickup system comprising the image pickup apparatus according to claim 1; and a signal processing unit that processes a signal output from the image pickup apparatus.

13. An image pickup apparatus comprising:

a pixel having n photoelectric conversion units (where n is a natural number that is equal to or higher than 2);

a first analog-digital converting unit that performs at least a part of an operation of converting a first photoelectric conversion signal based on signal charges generated by m photoelectric conversion units included in the n photoelectric conversion units (where m is a natural number that satisfies a relational expression of n>m) to a first digital signal during a first period; and a second analog-digital converting unit that performs at least a part of an operation of converting a second photoelectric conversion signal based on signal charges generated by the n photoelectric conversion units to a second digital signal during the first period.

14. The image pickup apparatus according to claim 13, further comprising a microlens, wherein
the microlens causes light beams condensed by the microlens to enter to the plurality of photoelectric conversion units of the pixel.

15. An image pickup system comprising:
the image pickup apparatus according to claim 14;
an optical system that condenses light beams to the image pickup apparatus; and
a signal processing unit that receives a signal from the image pickup apparatus, wherein
a first digital signal based on the first photoelectric conversion signal and a second digital signal based on the second photoelectric conversion signal are output from the image pickup apparatus to the signal processing unit;
the signal processing unit acquires a difference signal that is a difference between the first digital signal and the second digital signal, and performs focal point detection with the first digital signal used for acquiring the difference signal and the difference signal; and
the signal processing unit further forms an image with the second digital signal.

16. An image pickup system comprising:
the image pickup apparatus according to claim 13; and
a signal processing unit that processes a signal output from the image pickup apparatus.

17. A driving method for an image pickup apparatus having
a pixel including at least a first photoelectric conversion unit and a second photoelectric conversion unit which is different from the first photoelectric conversion unit;
a first analog-digital converting unit; and
a second analog-digital converting unit, the method comprising causing:
the first analog-digital converting unit
to perform at least a part of an operation of converting a first photoelectric conversion signal of the first photoelectric conversion unit to a first digital signal during a first period; and
the second analog-digital converting unit
to perform at least a part of an operation of converting a second photoelectric conversion signal of the second photoelectric conversion unit to a second digital signal during the first period.

18. The driving method for the image pickup apparatus according to claim 17, further comprising causing the pixel to output the first photoelectric conversion signal to the first analog-digital converting unit and then output the second photoelectric conversion signal to the second analog-digital converting unit.

19. The driving method for the image pickup apparatus according to claim 17, in which the image pickup apparatus further has a plurality of pixels and an adding circuit, the method comprising causing:
the plurality of pixels to output the photoelectric conversion signal to the adding circuit;
the adding circuit to output a signal in which the adding circuit adds the first photoelectric conversion signals output from different pixels, to the first analog-digital converting unit, and to output a signal in which the adding circuit adds the second photoelectric conversion signals output from different pixels, to the second analog-digital converting unit.

20. A driving method for an image pickup apparatus having
a pixel having n photoelectric conversion units (where n is a natural number that is equal to or higher than 2);
a first analog-digital converting unit; and
a second analog-digital converting unit,
the method comprising:
causing:
the first analog-digital converting unit to perform at least a part of an operation of converting a first photoelectric conversion signal based on signal charges generated by m photoelectric conversion units included in the n photoelectric conversion units (where m is a natural number that satisfies a relational expression of n>m) to a first digital signal during a first period;
the second analog-digital converting unit to perform at least a part of an operation of converting a second photoelectric conversion signal based on signal charges generated by the n photoelectric conversion units to a second digital signal during the first period; and
the pixel to operate in
a first mode in which the pixels outputs the first photoelectric conversion signal and the second photoelectric conversion signal; and
a second mode in which the first photoelectric conversion signal is not output but the second photoelectric conversion signal is output to at least one of the first analog-digital converting unit and the second analog-digital converting unit;
wherein
in the first mode, the first analog-digital converting unit to perform at least a part of an operation of converting the first photoelectric conversion signal to a first digital signal during the first period; and
in the second mode, at least one of the first analog-digital converting unit and the second analog-digital converting unit to perform an operation of converting the second photoelectric conversion signal to a second digital signal.

21. A driving method for an image pickup system, in which the image pickup system has
an image pickup apparatus; and
an optical system that condenses light beams to the image pickup apparatus;
the image pickup system performs signal processing on a signal output from the image pickup apparatus;
the image pickup apparatus has
a pixel having n photoelectric conversion units (where n is a natural number that is equal to or higher than 2);
a first analog-digital converting unit and a second analog-digital converting unit; and
a lens array having a plurality of microlenses; and
light condensed to one of the microlenses enters to the n photoelectric conversion units that the pixel has, the driving method comprising causing:
the pixel to output a first photoelectric conversion signal based on signal charges generated by m photoelectric conversion units included in the n photoelectric conversion units (where m is a natural number that satisfies a relational expression of n>m) on basis of incident light thereon to the first analog-digital converting unit;
the pixel to output second photoelectric conversion signal based on signal charges generated by the n photoelectric conversion units on basis of incident light thereon to the second analog-digital converting unit;
the first analog-digital converting unit to perform at least a part of an operation of converting the first photoelectric conversion signal to a first digital signal during a first period;

the second analog-digital converting unit to perform at least a part of an operation of converting the second photoelectric conversion signal to a second digital signal during the first period;
the image pickup apparatus to output the first digital signal; and
the image pickup apparatus to further output the second digital signal;
acquiring a difference signal that is a difference between the first digital signal and the second digital signal;
causing to perform a focal point detection with the first digital signal used for acquiring the difference signal and the difference signal; and
forming an image with the second digital signal.

* * * * *